United States Patent
Zewail et al.

(10) Patent No.: US 11,864,238 B2
(45) Date of Patent: Jan. 2, 2024

(54) MAPPING ASPECTS OF RANDOM ACCESS CHANNEL PROCEDURE

(71) Applicant: QUALCOMM Incorporated, San Diego, CA (US)

(72) Inventors: Ahmed Abdelaziz Ibrahim Abdelaziz Zewail, San Diego, CA (US); Xiaoxia Zhang, San Diego, CA (US); Tao Luo, San Diego, CA (US); Qiang Wu, San Diego, CA (US); Jun Ma, San Diego, CA (US); Iyab Issam Sakhnini, San Diego, CA (US); Mehmet Izzet Gurelli, San Diego, CA (US); Anantha Krishna Karthik Nagarajan, San Diego, CA (US); Jing Sun, San Diego, CA (US); Juan Montojo, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 3 days.

(21) Appl. No.: 17/305,067

(22) Filed: Jun. 30, 2021

(65) Prior Publication Data

US 2022/0007421 A1    Jan. 6, 2022

Related U.S. Application Data

(60) Provisional application No. 63/046,946, filed on Jul. 1, 2020.

(51) Int. Cl.
  *H04L 12/26*   (2006.01)
  *H04W 74/08*   (2009.01)
  *H04W 24/08*   (2009.01)

(52) U.S. Cl.
  CPC ....... *H04W 74/0833* (2013.01); *H04W 24/08* (2013.01)

(58) Field of Classification Search
  CPC .. H04W 74/0833; H04W 24/08; H04W 74/002
  USPC .......... 370/252, 328–330, 335–345
  See application file for complete search history.

(56) References Cited

U.S. PATENT DOCUMENTS

| | | | |
|---|---|---|---|
| 2019/0364599 A1* | 11/2019 | Islam | H04L 5/0048 |
| 2020/0015236 A1* | 1/2020 | Kung | H04W 16/14 |
| 2020/0236704 A1* | 7/2020 | Chande | H04W 72/044 |
| 2022/0132527 A1* | 4/2022 | Cui | H04W 72/1231 |
| 2022/0264659 A1* | 8/2022 | Enbuske | H04W 74/002 |

* cited by examiner

*Primary Examiner* — Thai D Hoang
(74) *Attorney, Agent, or Firm* — Harrity & Harrity, LLP

(57) ABSTRACT

Various aspects of the present disclosure generally relate to wireless communication. In some aspects, a user equipment may receive, from a base station, a random access configuration indicating synchronization signal block (SSB)-to-random access channel (RACH) occasion mapping information, wherein the SSB-to-RACH occasion mapping information is associated with a first set of RACH occasions and a second set of RACH occasions, select a RACH occasion based at least in part on the SSB-to-RACH occasion mapping information, and transmit, to the base station, a physical RACH communication using the RACH occasion based at least in part on selecting the RACH occasion. Numerous other aspects are provided.

30 Claims, 12 Drawing Sheets

US 11,864,238 B2

MAPPING ASPECTS OF RANDOM ACCESS CHANNEL PROCEDURE

CROSS-REFERENCE TO RELATED APPLICATION

This Patent Applications claims priority to U.S. Provisional Patent Application No. 63/046,946, filed on Jul. 1, 2020, entitled "MAPPING ASPECTS OF RANDOM ACCESS CHANNEL PROCEDURE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for mapping aspects of a random access channel (RACH) procedure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, a random access configuration indicating synchronization signal block (SSB)-to-random access channel (RACH) occasion mapping information, wherein the SSB-to-RACH occasion mapping information is associated with a first set of RACH occasions and a second set of RACH occasions; selecting a RACH occasion based at least in part on the SSB-to-RACH occasion mapping information; and transmitting, to the base station, a physical RACH (PRACH) communication using the RACH occasion based at least in part on selecting the RACH occasion.

In some aspects, a method of wireless communication performed by a base station includes transmitting, to one or more UEs, a random access configuration indicating the SSB-to-RACH occasion mapping information, wherein the SSB-to-RACH occasion mapping information is associated with a first set of RACH occasions and a second set of RACH occasions; and receiving, from a UE of the one or more UEs, a PRACH communication using a RACH occasion based at least in part on the SSB-to-RACH occasion mapping information.

In some aspects, a UE for wireless communication includes a memory and one or more processors coupled to the memory, the one or more processors configured to: receive, from a base station, a random access configuration indicating SSB-to-RACH occasion mapping information, wherein the SSB-to-RACH occasion mapping information is associated with a first set of RACH occasions and a second set of RACH occasions; select a RACH occasion based at least in part on the SSB-to-RACH occasion mapping information; and transmit, to the base station, a PRACH communication using the RACH occasion based at least in part on selecting the RACH occasion.

In some aspects, a base station for wireless communication includes a memory and one or more processors coupled to the memory, the one or more processors configured to: transmit, to one or more UEs, a random access configuration indicating the SSB-to-RACH occasion mapping information, wherein the SSB-to-RACH occasion mapping information is associated with a first set of RACH occasions and a second set of RACH occasions; and receive, from a UE of the one or more UEs, a PRACH communication using a RACH occasion based at least in part on the SSB-to-RACH occasion mapping information.

In some aspects, a non-transitory computer-readable medium storing a set of instructions for wireless communication includes one or more instructions that, when executed by one or more processors of a UE, cause the UE to: receive, from a base station, a random access configuration indicating SSB-to-RACH occasion mapping information, wherein the SSB-to-RACH occasion mapping information is associated with a first set of RACH occasions and a second set of RACH occasions; select a RACH occasion based at least in part on the SSB-to-RACH occasion mapping information; and transmit, to the base station, a PRACH communication using the RACH occasion based at least in part on selecting the RACH occasion.

In some aspects, a non-transitory computer-readable medium storing a set of instructions for wireless communication includes one or more instructions that, when executed by one or more processors of a base station, cause the base station to: transmit, to one or more UEs, a random access configuration indicating the SSB-to-RACH occasion mapping information, wherein the SSB-to-RACH occasion mapping information is associated with a first set of RACH occasions and a second set of RACH occasions; and receive, from a UE of the one or more UEs, a PRACH communication using a RACH occasion based at least in part on the SSB-to-RACH occasion mapping information.

In some aspects, an apparatus for wireless communication includes means for receiving, from a base station, a random access configuration indicating SSB-to-RACH occasion mapping information, wherein the SSB-to-RACH occasion mapping information is associated with a first set of RACH occasions and a second set of RACH occasions; means for selecting a RACH occasion based at least in part on the SSB-to-RACH occasion mapping information; and means for transmitting, to the base station, a PRACH communication using the RACH occasion based at least in part on selecting the RACH occasion.

In some aspects, an apparatus for wireless communication includes means for transmitting, to one or more UEs, a random access configuration indicating the SSB-to-RACH occasion mapping information, wherein the SSB-to-RACH occasion mapping information is associated with a first set of RACH occasions and a second set of RACH occasions; and means for receiving, from a UE of the one or more UEs, a PRACH communication using a RACH occasion based at least in part on the SSB-to-RACH occasion mapping information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
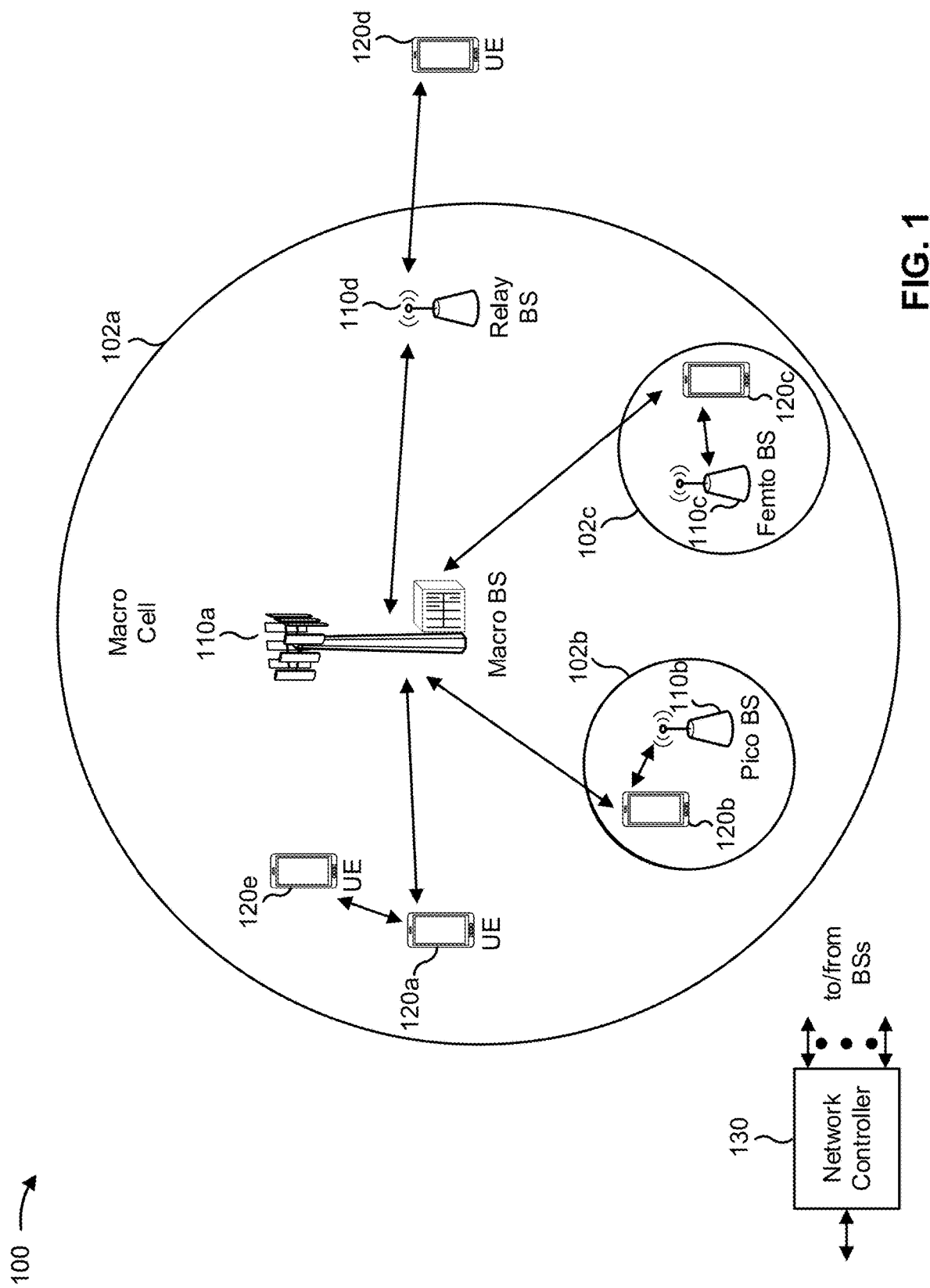
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
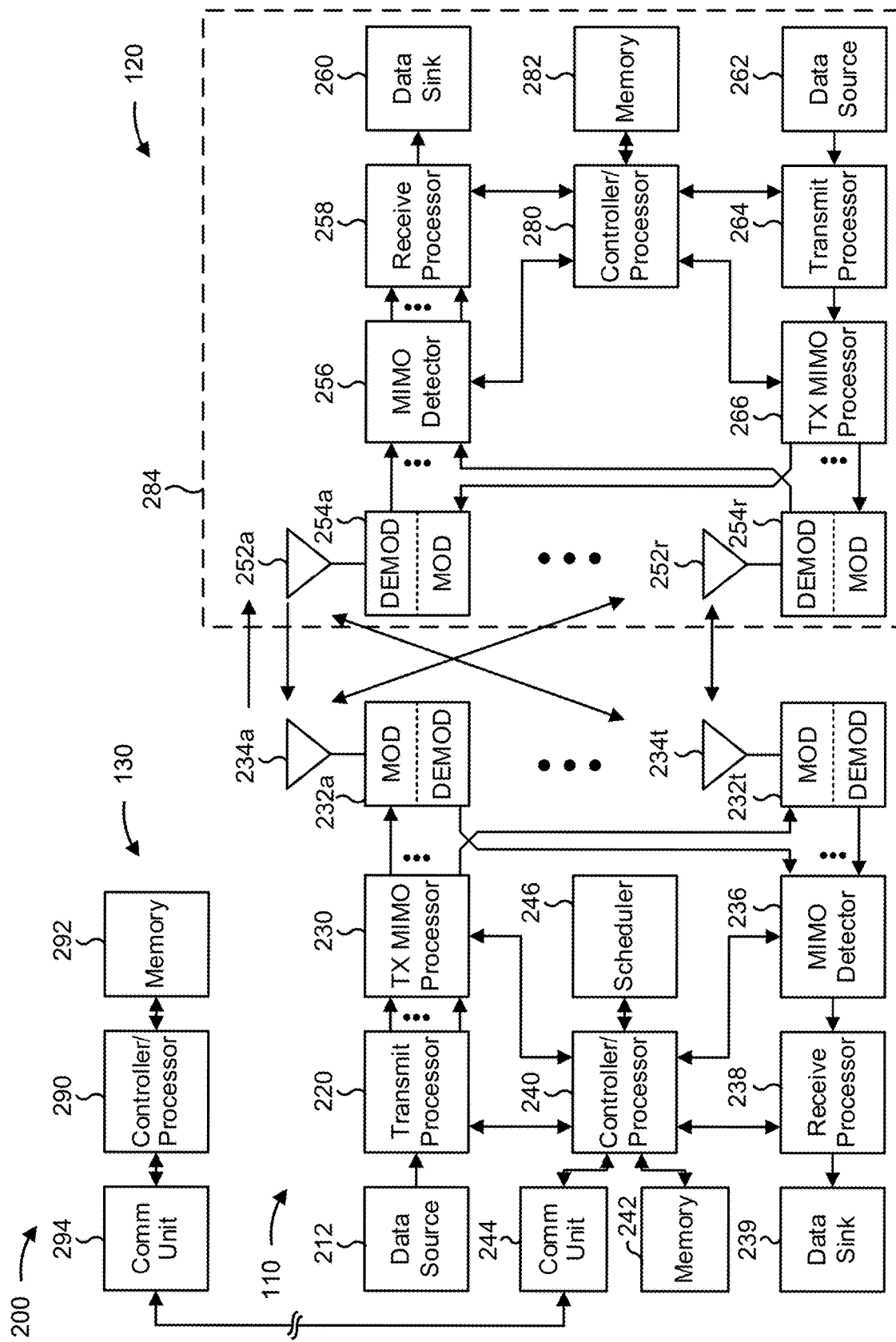
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-10).

Controller/processor 240 of base station 110, controller/processor 280 of UE 120, and/or any other component(s) of FIG. 2 may perform one or more techniques associated with mapping aspects of a RACH procedure, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, UE 120 may include means for receiving, from a base station, a random access configuration indicating synchronization signal block (SSB)-to-RACH occasion mapping information, wherein the SSB-to-RACH occasion mapping information is associated with a first set of RACH occasions and a second set of RACH occasions, means for selecting a RACH occasion based at least in part on the SSB-to-RACH occasion mapping information; and/or means for transmitting, to the base station, a physical RACH (PRACH) communication using the RACH occasion based at least in part on selecting the RACH occasion; among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining SSB-to-RACH occasion mapping information, wherein the SSB-to-RACH occasion mapping information is associated with a first set of RACH occasions and a second set of RACH occasions; means for transmitting, to one or more UEs, a random access configuration indicating the SSB-to-RACH occasion mapping information, the SSB-to-RACH occasion mapping information is associated with the first set of RACH occasions and the second set of RACH occasions; and/or means for receiving, from a UE of the one or more UEs, a PRACH communication in a RACH occasion based at least in part on the SSB-to-RACH occasion mapping information; among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
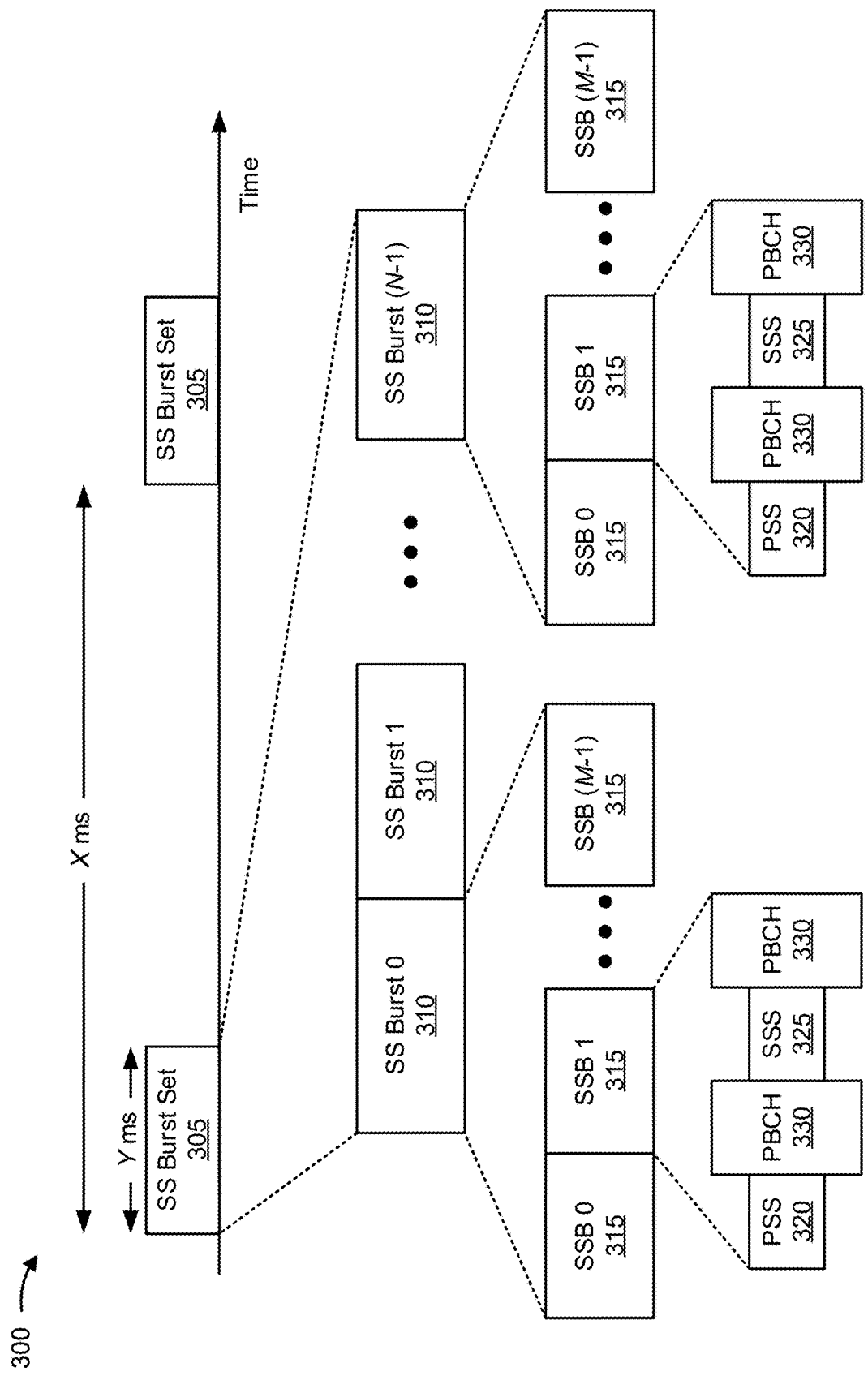
FIG. 3 is a diagram illustrating an example of a synchronization signal hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by the base station. As further shown, each SS burst 310 may include one or more SSBs 315, shown as SSB 0 through SSB M−1, where M is a maximum number of SSBs 315 that can be carried by an SS burst 310. In some examples, different SSBs 315 may be beam-formed differently (e.g., transmitted using different beams), and may be used for beam management, beam selection, and/or the like (e.g., as part of an initial network access procedure). An SS burst set 305 may be periodically transmitted by a wireless node (e.g., base station 110), such as every X milliseconds, as shown in FIG. 3. In some examples, an SS burst set 305 may have a fixed or dynamic length, shown as Y milliseconds in FIG. 3. In some cases, an SS burst set 305 or an SS burst 310 may be referred to as a discovery reference signal (DRS) transmission window, and/or an SSB measurement time configuration (SMTC) window, among other examples.

In some examples, an SSB 315 may include resources that carry a PSS 320, an SSS 325, a physical broadcast channel (PBCH) 330, and/or the like. In some examples, multiple SSBs 315 are included in an SS burst 310 (e.g., with transmission on different beams), and the PSS 320, the SSS 325, and/or the PBCH 330 may be the same across each SSB 315 of the SS burst 310. In some examples, a single SSB 315 may be included in an SS burst 310. In some examples, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some examples, an SSB 315 may be referred to as an SS/PBCH block.

In some examples, the symbols of an SSB 315 are consecutive, as shown in FIG. 3. In some examples, the symbols of an SSB 315 are non-consecutive. Similarly, in some examples, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some examples, the SS bursts 310 may have a burst period, and the SSBs 315 of the SS burst 310 may be transmitted by a wireless node (e.g., base station 110) according to the burst period. In this case, the SSBs 315 may be repeated during each SS burst 310. In some examples, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some examples, an SSB 315 may include an SSB index, which may correspond to a beam used to carry the SSB 315. A UE 120 may monitor for and/or measure SSBs 315 using different receive (Rx) beams during an initial network access procedure. Based at least in part on the monitoring and/or measuring, the UE 120 may indicate one or more SSBs 315 with a best signal parameter (e.g., an RSRP parameter) to a base station 110. The base station 110 and the UE 120 may use the one or more indicated SSBs 315 to select one or more beams to be used for communication between the base station 110 and the UE 120 (e.g., for a RACH procedure). Additionally, or alternatively, the UE 120 may use the SSB 315 and/or the SSB index to determine a cell timing for a cell via which the SSB 315 is received (e.g., a serving cell).

As indicated above, FIG. 3 is provided as an example. Other examples may differ from what is described with regard to FIG. 3.

Figure 4:
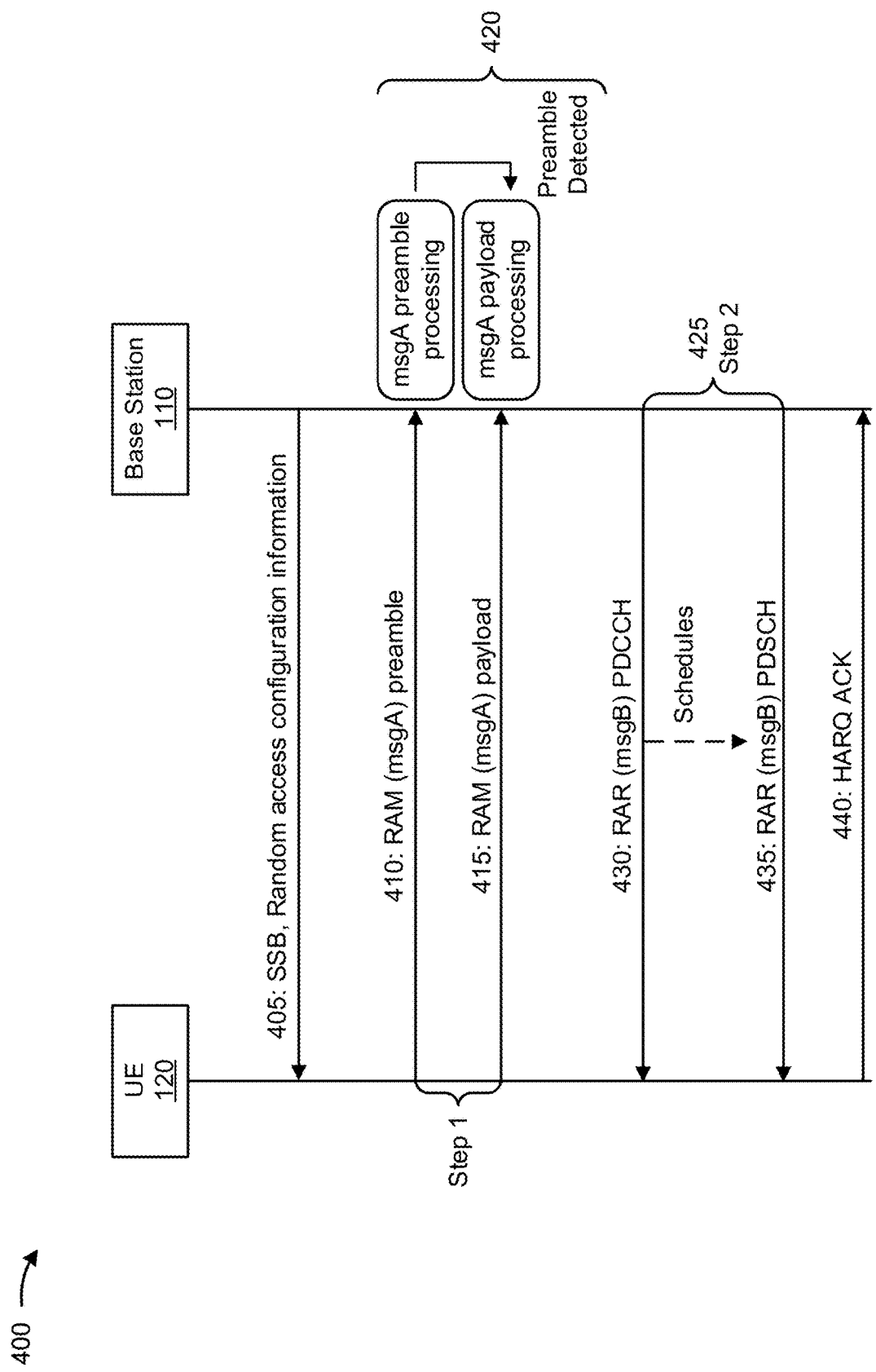
FIG. 4 is a diagram illustrating an example of a two-step random access procedure, in accordance with the present disclosure.

FIG. 4 is a diagram illustrating an example 400 of a two-step random access procedure, in accordance with various present disclosure. As shown in FIG. 4, a base station 110 and a UE 120 may communicate with one another to perform the two-step random access procedure.

As shown by reference number 405, the base station 110 may transmit, and the UE 120 may receive, one or more SSBs and random access configuration information. In some examples, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM), receiving a random access response (RAR) to the RAM, and/or the like.

As shown by reference number 410, the UE 120 may transmit, and the base station 110 may receive, a RAM preamble. As shown by reference number 415, the UE 120 may transmit, and the base station 110 may receive, a RAM payload. As shown, the UE 120 may transmit the RAM preamble and the RAM payload to the base station 110 as part of an initial (or first) step of the two-step random access procedure. In some examples, the RAM may be referred to as message A, msgA, a first message, an initial message, and/or the like in a two-step random access procedure. Furthermore, in some examples, the RAM preamble may be referred to as a message A preamble, a msgA preamble, a preamble, a PRACH preamble, and/or the like, and the RAM payload may be referred to as a message A payload, a msgA payload, a payload, and/or the like. In some examples, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), a physical uplink shared channel (PUSCH) transmission, and/or the like).

As shown by reference number 420, the base station 110 may receive the RAM preamble transmitted by the UE 120. If the base station 110 successfully receives and decodes the RAM preamble, the base station 110 may then receive and decode the RAM payload.

As shown by reference number 425, the base station 110 may transmit an RAR (sometimes referred to as an RAR message). As shown, the base station 110 may transmit the RAR message as part of a second step of the two-step random access procedure. In some examples, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, contention resolution information, and/or the like.

As shown by reference number 430, as part of the second step of the two-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 435, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 440, if the UE 120 successfully receives the RAR, the UE 120 may transmit a hybrid automatic repeat request (HARD) acknowledgement (ACK).

As indicated above, FIG. 4 is provided as an example. Other examples may differ from what is described with regard to FIG. 4.

Figure 5:
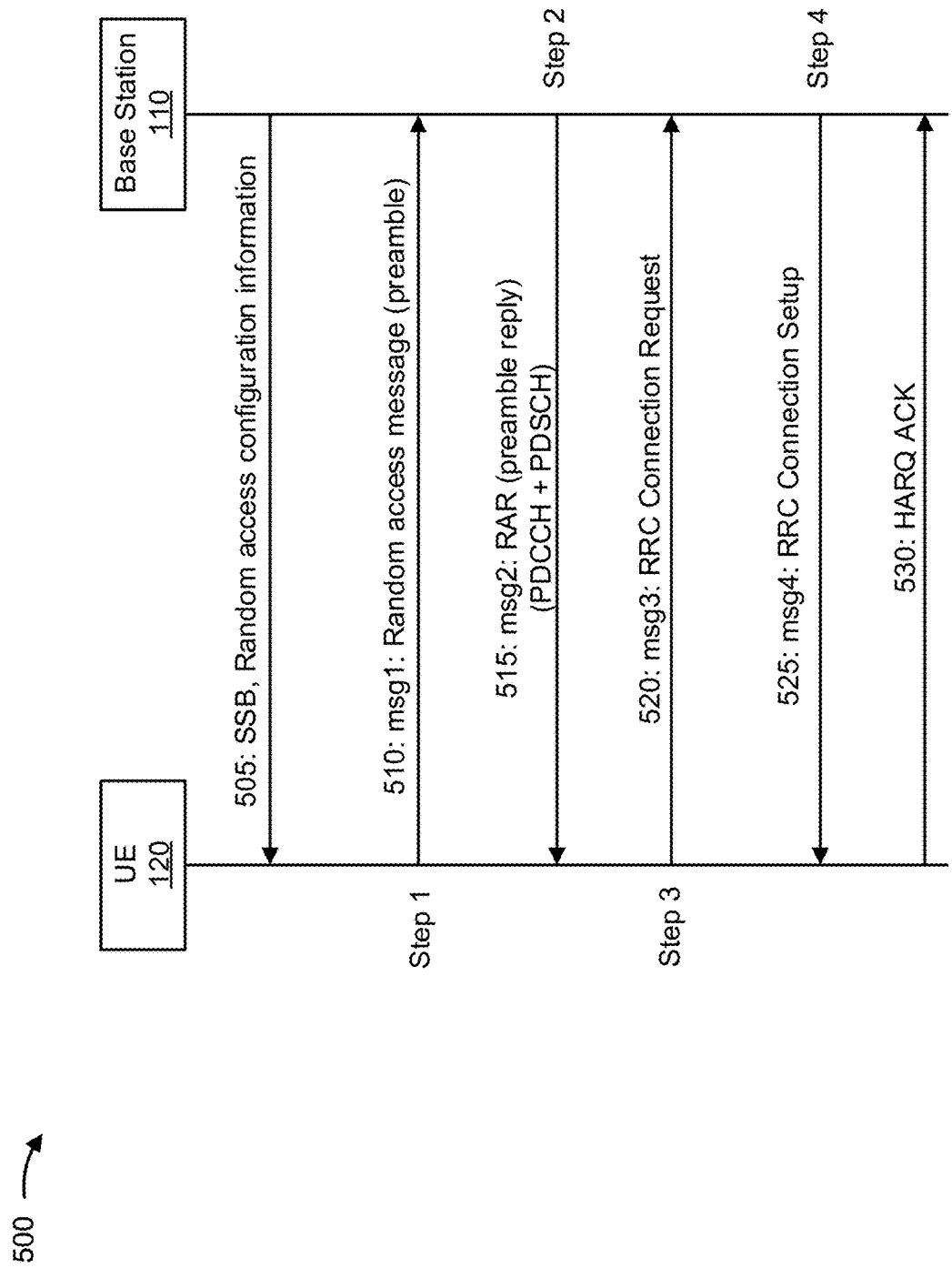
FIG. 5 is a diagram illustrating an example of a four-step random access procedure, in accordance with the present disclosure.

FIG. 5 is a diagram illustrating an example 500 of a four-step random access procedure, in accordance with the present disclosure. As shown in FIG. 5, a base station 110 and a UE 120 may communicate with one another to perform the four-step random access procedure.

As shown by reference number 505, the base station 110 may transmit, and the UE 120 may receive, one or more SSBs and random access configuration information. In some examples, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM, one or more parameters for receiving an RAR, and/or the like.

As shown by reference number 510, the UE 120 may transmit a RAM, which may include a preamble (sometimes referred to as a random access preamble, a PRACH preamble, and/or a RAM preamble). The message that includes the preamble may be referred to as a message 1, msg1, MSG1, a first message, and/or an initial message, among other examples, in a four-step random access procedure. The random access message may include a random access preamble identifier.

As shown by reference number 515, the base station 110 may transmit an RAR as a reply to the preamble. The message that includes the RAR may be referred to as message 2, msg2, MSG2, or a second message in a four-step random access procedure. In some examples, the RAR may indicate the detected random access preamble identifier (e.g., received from the UE 120 in msg1). Additionally, or alternatively, the RAR may indicate a resource allocation to be used by the UE 120 to transmit message 3 (msg3).

In some examples, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 520, the UE 120 may transmit an RRC connection request message. The RRC connection request message may be referred to as message 3, msg3, MSG3, or a third message of a four-step random access procedure. In some examples, the RRC connection request may include a UE identifier, UCI, a PUSCH communication (e.g., an RRC connection request), and/or the like.

As shown by reference number 525, the base station 110 may transmit an RRC connection setup message. The RRC connection setup message may be referred to as message 4, msg4, MSG4, or a fourth message of a four-step random access procedure. In some examples, the RRC connection setup message may include the detected UE identifier, a timing advance value, contention resolution information, and/or the like. As shown by reference number 530, if the UE 120 successfully receives the RRC connection setup message, the UE 120 may transmit a HARQ ACK.

As indicated above, FIG. 5 is provided as an example. Other examples may differ from what is described with regard to FIG. 5.

Figure 6:
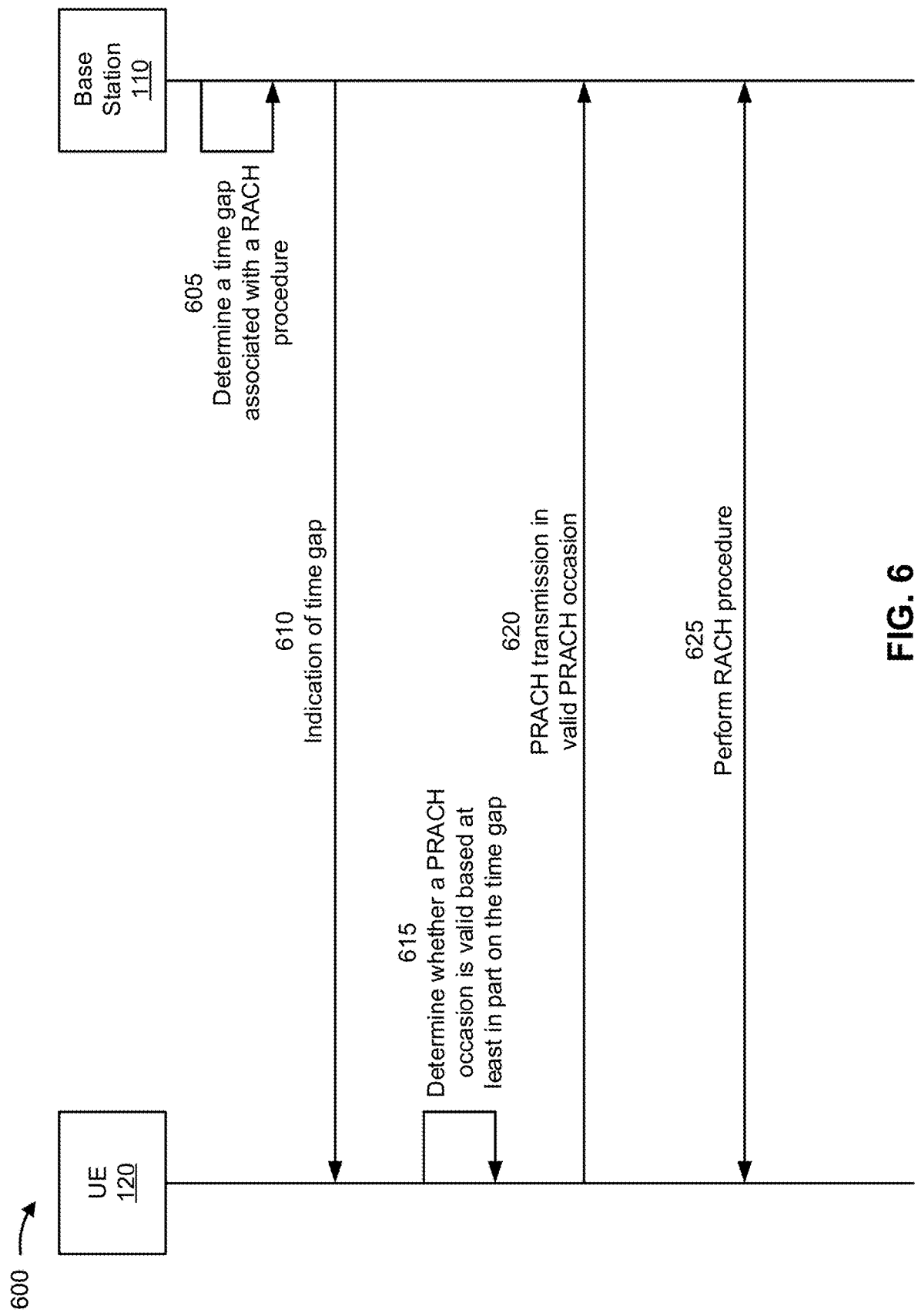
FIG. 6 is a diagram illustrating an example associated with capability reporting for a random access channel (RACH) procedure, in accordance with the present disclosure.

FIG. 6 is a diagram illustrating an example 600 associated with capability reporting for a RACH procedure, in accordance with the present disclosure. As shown in FIG. 6, a base station 110 and a UE 120 may communicate with one another in a wireless network (e.g., wireless network 100).

As shown by reference number 605, the base station 110 may determine a time gap value associated with a RACH procedure based at least in part on a capability of the base station 110. The time gap value may be based at least in part on an amount of time the base station 110 needs to switch between transmitting an SSB and receiving a PRACH transmission. The capability of the base station 110 may be a full duplex capability of the base station 110, a spatial diversity, at the base station, of a transmit beam and a receive beam for one or more RACH resources, and/or the like. For example, the base station 110 may support full duplex communication (e.g., the base station 110 may be capable of receiving and transmitting at the same time). As a result, the base station 110 may need little or no time between transmitting an SSB and receiving a PRACH transmission.

The base station 110 may determine that a RACH resource has sufficient spatial diversity such that the base station 110 may need little or no time between transmitting an SSB and receiving a PRACH transmission. For example, an SSB transmit beam and a PRACH receive beam for a specific RACH resource may have sufficient separation at the base station 110 to allow for little or no time between transmitting an SSB and receiving a PRACH transmission (e.g., the SSB transmit beam and the PRACH receive beam may be separated such that there is no or little interference between the SSB transmit beam and the PRACH receive beam).

In some examples, the base station 110 may determine that the time gap value associated with the RACH procedure that is based at least in part on the capability of the base station 110 is different than a stored or pre-configured time gap value associated with the RACH procedure. For example, the base station 110 and/or the UE 120 may be pre-configured with a time gap value or have a stored time gap value for the RACH procedure. The stored or pre-configured time gap value may be based at least in part on a wireless communication standard, such as a 3GPP Technical Specification (T.S.) (e.g., an Ngap value defined by 3GPP T.S. 38.213). The stored or pre-configured time gap value may not be based at least in part on a capability of the base station 110. The base station 110 may determine that the time gap value that is based at least in part on the capability of the base station 110 is different than a stored or pre-configured time gap value associated with the RACH procedure.

As shown by reference number 610, the base station 110 may transmit an indication of the time gap value associated with the RACH procedure, based at least in part on determining the time gap value associated with the RACH procedure. The base station 110 may transmit the indication of the time gap value associated with the RACH procedure using Layer 1 signaling, Layer 2 signaling, RRC signaling, broadcast signaling, and/or the like. In some examples, the indication of the time gap value associated with the RACH procedure may be included in random access configuration information that is transmitted by the base station 110. In some examples, the base station 110 may configure a SIB to include the indication of the time gap value associated with the RACH procedure. The base station 110 may transmit the SIB including the indication of the time gap value associated with the RACH procedure.

The UE 120 may receive the indication of the time gap value associated with the RACH procedure that is based at least in part on a capability of the base station. The UE 120 may determine one or more (or all) RACH resources that are associated with the time gap value based at least in part on the indication of the time gap value associated with the RACH procedure.

As shown by reference number 615, the UE 120 may determine whether a RACH occasion (e.g., a transmission opportunity for the UE 120 associated with the RACH procedure) associated with the RACH procedure is valid based at least in part on receiving the indication of the time gap value associated with the RACH procedure. For example, the UE 120 may determine a stored or pre-configured time gap value associated with the RACH procedure (e.g., the stored or pre-configured time gap value that is based at least in part on a wireless communication standard discussed above). The UE 120 may refrain from using the stored or pre-configured time gap value associated with the RACH procedure when determining whether the RACH occasion associated with the RACH procedure is valid, based at least in part on receiving the indication of the time gap value associated with the RACH procedure. That is, the UE 120 may replace the stored or pre-configured time gap value with the time gap value indicated by the base station 110 when determining whether a RACH occasion associated with the RACH procedure is valid.

For example, the UE 120 may determine a starting symbol associated with a transmission opportunity associated with the RACH procedure (e.g., a PRACH occasion). The UE 120 may determine an ending symbol (e.g., a last symbol) of a last received SSB (e.g., the most recently received SSB). The UE 120 may determine whether a quantity of symbols between the ending symbol of the last received SSB and the starting symbol associated with the RACH occasion satisfies the time gap value (e.g., indicated by the base station 110).

As shown by reference number 620, the UE 120 may selectively transmit, to the base station 110, a PRACH transmission in the RACH occasion based at least in part on determining whether the RACH occasion is valid. That is, if the UE 120 determines that the RACH occasion is valid, the UE 120 may transmit the PRACH transmission in the RACH occasion. If the UE 120 determines that the RACH occasion is not valid, the UE 120 may not transmit the PRACH transmission in the RACH occasion. In some examples, the PRACH transmission may be a PRACH preamble associated with the RACH procedure. The base station 110 may selectively receive the PRACH transmission in the RACH occasion in a similar manner as described above.

As shown by reference number 625, the base station 110 and the UE 120 may perform the RACH procedure using valid RACH occasions (e.g., determined using the time gap value that is based at least in part on the capability of the base station 110). For example, the base station 110 and the UE 120 may perform a two-step RACH procedure (e.g., as described above with respect to FIG. 3), a four-step RACH procedure (e.g., as described above with respect to FIG. 4), and/or the like.

As a result, RACH occasions that would have otherwise been wasted (e.g., determined to be invalid by the UE 120 using the stored or pre-configured time gap value) may be utilized by the UE 120 and the base station 110 associated with a RACH procedure. This improves network performance by enabling the UE 120 to transmit in more RACH occasions than if the UE 120 were to determine valid RACH occasions without considering the capability of the base station 110.

As indicated above, FIG. 6 is provided as an example. Other examples may differ from what is described with respect to FIG. 6.

In some wireless networks, RACH occasions are mapped to SSB (e.g., an SS/physical broadcast channel (SS/PBCH) block) indexes to enable a base station to associate preambles included in a PRACH transmission (e.g., transmitted in a RACH occasion) to SSB beams. For example, for a mapping cycle, RACH occasions may be mapped consecutively to corresponding SSB indexes. SSB indexes may be mapped first in increasing order of preamble indexes within a single RACH occasion (e.g., where multiple SSBs are to be mapped to a single RACH occasion), second in increasing order of frequency resource indexes for frequency multiplexed RACH occasions, third in increasing order of time resource indexes for time multiplexed RACH occasions within a RACH slot, and fourth in increased order of indexes for RACH slots.

However, in a case where some RACH occasions are not valid for certain UEs within a network, but are valid for other UEs within the network, the above SSB-to-RACH mapping rule may fail. For example, if certain UEs cannot receive and/or decode a signal from a base station indicating a new time gap value for the RACH procedure (e.g., as described above with respect to FIG. 6), some RACH occasions will be invalid for those UEs. However, other UEs may be capable of receiving and/or decoding the signal from a base station indicating a new time gap value for the RACH procedure. As a result, some RACH occasions may be valid for some UEs in the network, while invalid for other UEs. Therefore, if the RACH occasions were to be consecutively mapped to SSB indexes as described above, the base station may be unable to differentiate between RACH transmissions corresponding to the RACH occasions that are valid for all UEs in the network and RACH occasions which are only valid for some UEs in the network. As a result, the base station may be unable to properly associate PRACH preambles (e.g., transmitted in the RACH occasions) to SSB beams.

Some techniques and apparatuses described herein enable SSB-to-RACH occasion mapping when certain RACH occasions are considered invalid for some UEs in a network while valid for other UEs in the network. For example, a base station may determine SSB-to-RACH occasion mapping information for a set of RACH occasions associated with a RACH procedure. As a result, the base station is enabled to properly associate PRACH preambles (e.g., transmitted in the RACH occasions) to SSB beams when some RACH occasions, in the set of RACH occasions, are valid for all UEs in a network and some RACH occasions, in the set of RACH occasions, are only valid for some UEs in the network. Additionally, UEs may utilize the RACH occasions that are valid based at least in part on the time gap value indicated by the base station to indicate additional information associated with the RACH procedure. This improves network performance by enabling the UE and the base station to quickly exchange information during the RACH procedure, as the UE may utilize more RACH occasions than if the UE were to use the pre-configured or stored time gap value associated with the RACH procedure.

Figure 7:
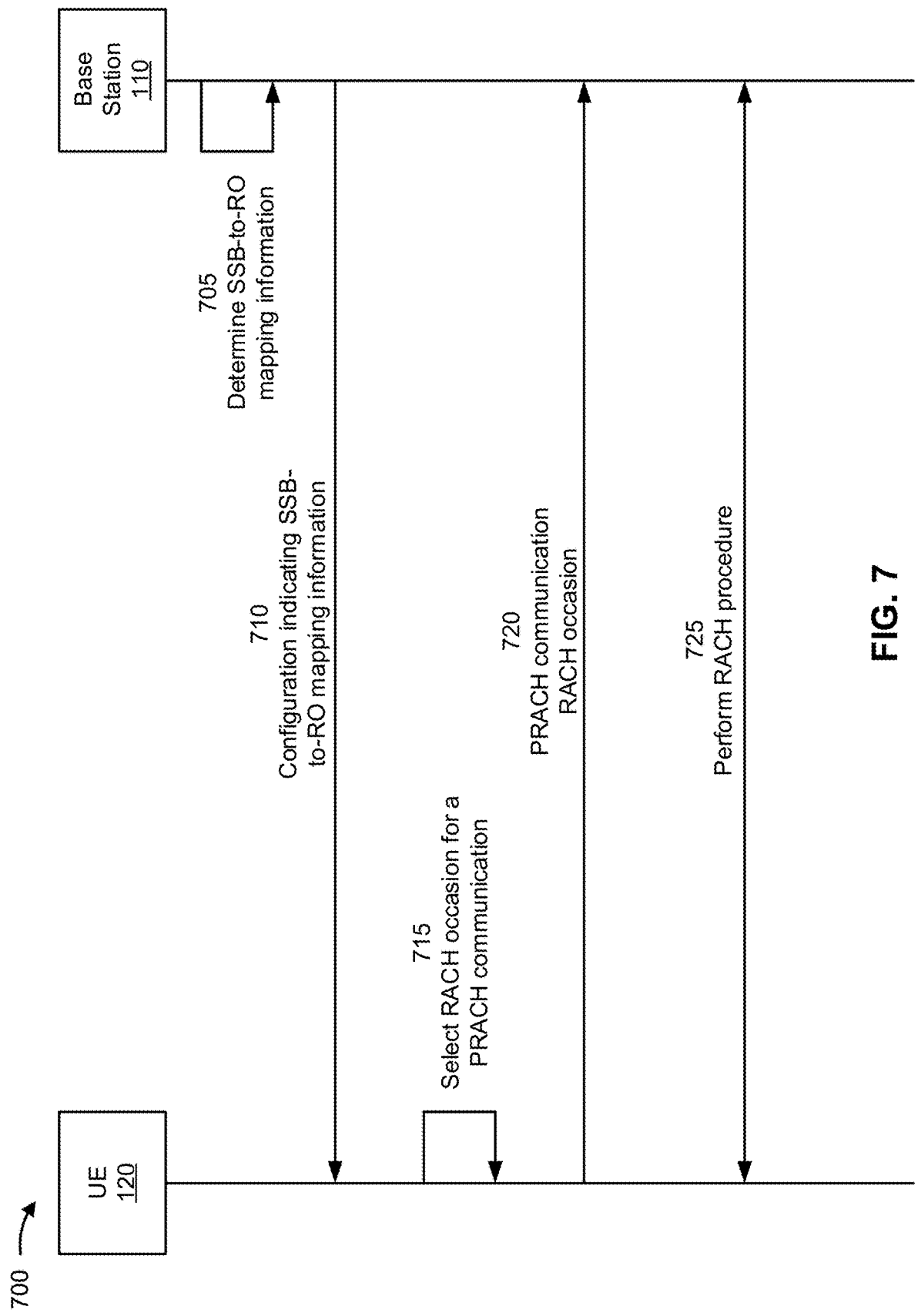
FIGS. 7-8 are diagrams illustrating examples associated with mapping aspects of a RACH procedure, in accordance with the present disclosure.

FIG. 7 is a diagram illustrating an example 700 associated with mapping aspects of a RACH procedure, in accordance with the present disclosure. As shown in FIG. 7, a base station 110 and a UE 120 may communicate with one another in a wireless network (e.g., wireless network 100).

As shown by reference number 705, the base station 110 may determine SSB-to-RACH occasion mapping information for a RACH procedure. In some aspects, the SSB-to-RACH occasion mapping information may be associated with a first set of RACH occasions and a second set of RACH occasions. The first set of RACH occasions may be valid for each UE 120 associated with the base station (e.g., based at least in part on a stored or pre-configured time gap value, as described above with respect to FIG. 6). The second set of RACH occasions may be valid for a proper subset of UEs 120 associated with the base station 110 (i.e., may be valid for some, but not all, of the UEs 120 associated with the base station). In some aspects, the UEs 120 included in the proper subset of UEs 120 associated with the base station 110 may be UEs 120 that are capable of receiving and/or decoding the signal from the base station 110 indicating the time gap value associated with the RACH procedure.

In some aspects, UEs 120 included in the proper subset of UEs 120 associated with the base station 110 may have a RACH capability. The RACH capability may be a capability of a UE 120 to receive and/or decode a signal from the base station 110 indicating the time gap value (e.g., as described above with respect to FIG. 6). In some aspects, the RACH capability may be a capability of the UE 120 to transmit during a RACH occasion which is valid based at least in part on the time gap value indicated by the base station 110. For example, a RACH occasion which is valid based at least in part on the time gap value indicated by the base station 110 may occur shortly after, or directly after, an SSB is received by the UE 120. Therefore, the RACH capability of the UE 120 may be associated with a full duplex capability (e.g., a capability to receive and transmit at the same time), and/or a capability of the UE 120 to determine to not receive the SSB (e.g., skip the SSB) and to transmit during the RACH occasion, among other examples.

The base station 110 may determine the SSB-to-RACH occasion mapping information for the RACH procedure by mapping RACH occasions included in the first set of RACH occasions to one or more SSBs and by mapping RACH occasions included in the second set of RACH occasions to one or more SSBs. For example, the base station 110 may consecutively map RACH occasions in the first set of RACH occasions to one or more SSBs (e.g., first in increasing order of preamble indexes within a single RACH occasion (e.g., where multiple SSBs are to be mapped to a single RACH occasion), second in increasing order of frequency resource indexes for frequency multiplexed RACH occasions, third in increasing order of time resource indexes for time multiplexed RACH occasions within a RACH slot, and fourth in increased order of indexes for RACH slots). The base station 110 may consecutively map RACH occasions in the first set of RACH occasions to one or more SSBs in a similar manner. In some aspects, the RACH occasions included in the first set of RACH occasions are mapped by the base station 110 to one or more SSBs before the RACH occasions included in the second set of RACH occasions are mapped to one or more SSBs.

In some aspects, the one or more SSBs mapped to the first set of RACH occasions may be the same one or more SSBs mapped to the second set of RACH occasions. In some aspects, the one or more SSBs mapped to the first set of RACH occasions may be different than one or more SSBs mapped to the second set of RACH occasions (e.g., the first set of RACH occasions may be mapped to a first set of SSBs and the second set of RACH occasions may be mapped to a second set of SSBs). In some aspects, the base station 110 may map the second set of RACH occasions to one or more SSBs for the UEs 120 included in the proper subset of UEs 120 associated with the base station 110 (e.g., UEs 120 not included in the proper subset of UEs 120 associated with the base station 110 may not receive SSB-to-RACH occasion mapping information for the second set of RACH occasions).

For example, a random access configuration may indicate that a RACH procedure includes RACH occasions (ROs) RO1, RO2, RO3, RO4, and RO5. In some aspects, RO1, RO3, and RO5 may be valid for all UEs 120 associated with the base station 110 (e.g., based at least in part on a pre-configured or stored time gap value). RO2 and RO4 may be determined to be valid (e.g., by a UE 120) only if using the time gap value indicated by the base station 110 (e.g., as described above with respect to FIG. 6). The base station 110 may be associated with 4 SSBs (e.g., SSB0, SSB1, SSB2, and SSB3). First, the base station 110 may map RO1, RO3, and RO5 consecutively to the SSBs (e.g., RO1 to SSB0, RO3 to SSB1, RO5 to SSB2). Second, the base station 110 may map RO2 and RO4 consecutively to the SSBs (e.g., RO2 to SSB0, RO4 to SSB1).

As shown by reference number 710, the base station 110 may transmit a configuration (e.g., a random access configuration) indicating the SSB-to-RACH occasion mapping information. In some aspects, the base station 110 may transmit SSB-to-RACH occasion mapping information, indicating SSB-to-RACH occasion mapping information for the first set of RACH occasions and the second set of RACH occasions, to UEs 120 that include the RACH capability (e.g., are included in the proper subset of UEs 120 associated with the base station 110). In some aspects, the base station 110 may transmit SSB-to-RACH occasion mapping information indicating SSB-to-RACH occasion mapping information for the first set of RACH occasions (e.g., and not the second set of RACH occasions) to UEs 120 that do not include the RACH capability. The UE 120 may receive the configuration and may determine or identify the SSB-to-RACH occasion mapping information.

As shown by reference number 715, the UE 120 may select a RACH occasion for a PRACH communication (e.g., a PRACH transmission, a PRACH preamble, and/or the like). The UE 120 may include the RACH capability (e.g., the UE 120 may be capable of receiving and/or decoding the signal from the base station 110 indicating the time gap value). The UE 120 may select a RACH occasion included in the second set of RACH occasions based at least in part on the RACH capability of the UE 120.

In some aspects, the UE 120 may utilize the RACH occasions included in the second set of RACH occasions for different purposes associated with the RACH procedure.

This improves network performance by enabling the UE 120 to transmit information or indications using RACH occasions that would not have otherwise been valid or available for the UE 120.

For example, the UE 120 may utilize a RACH occasion included in the second set of RACH occasions to indicate a need for additional or enhanced wireless coverage (e.g., to indicate that a signal from the base station 110 is poor, and/or the like). The UE 120 may receive an SSB from the base station 110. The UE 120 may measure the beam associated with the SSB to obtain an RSRP value of the beam of the SSB. The UE 120 may determine whether the RSRP value of the beam of the SSB satisfies a threshold. In some aspects, the threshold may be configured by the base station 110 (e.g., in a random access configuration, and/or the like). If the RSRP value of the beam of the SSB does not satisfy the threshold, the UE 120 may select a RACH occasion included in the second set of RACH occasions to transmit a PRACH communication indicating a request or a need for enhanced wireless coverage.

In some aspects, the UE 120 may utilize a RACH occasion included in the second set of RACH occasions to indicate a capability of the UE 120. For example, the UE 120 may determine that the UE 120 is associated with a capability (e.g., a full duplex capability, a dual connectivity capability, and/or a communication capability) or a category of UEs 120 (e.g., indicating a combined uplink performance capability and downlink performance). For example, the UE 120 may utilize a RACH occasion included in the second set of RACH occasions to indicate one or more parameters that are capable of being configured or reconfigured for the UE 120.

As shown by reference number 720, the UE 120 may transmit a PRACH communication in a RACH occasion based at least in part on the SSB-to-RACH occasion mapping information. For example, the UE 120 may receive an SSB and select a RACH occasion included in the second set of RACH occasions that is associated with the SSB based at least in part on the SSB-to-RACH occasion mapping information. The PRACH transmission may be in a RACH occasion in the first set of RACH occasions or a RACH occasion in the second set of RACH occasions. In some aspects, the PRACH transmission, transmitted in the second set of RACH occasions, may indicate a need or request for enhanced wireless coverage, a capability or category of the UE 120, and/or the like.

The base station 110 may receive the PRACH transmission, in a RACH occasion, and may identify an SSB beam associated with the RACH occasion based at least in part on the SSB-to-RACH occasion mapping information. For example, as the RACH occasions included in the first set of RACH occasions were consecutively mapped together and the RACH occasions included in the second set of RACH occasions were consecutively mapped together, RACH occasion reception beams may be common for all UEs 120 included in the network. This enables the base station 110 to properly associate SSB beams to one or more preambles received in the PRACH communication.

As shown by reference number 725, the base station 110 and the UE 120 may perform the RACH procedure based at least in part on the transmission of the PRACH communication. For example, the base station 110 and the UE 120 may perform a two-step RACH procedure (e.g., as described above with respect to FIG. 3), and/or a four-step RACH procedure (e.g., as described above with respect to FIG. 4), among other examples. For example, the base station 110 may receive the PRACH communication and identify that the PRACH communication was sent in a RACH occasion included in the second set of RACH occasions. The base station 110 may configure a random access response (e.g., a Msg2 and/or a MsgB) based at least in part on identifying that the PRACH communication was sent in a RACH occasion included in the second set of RACH occasions. For example, the base station 110 may determine that the PRACH communication indicates a need or a request for enhanced wireless coverage. The base station 110 may configure the random access response to respond to the need or a request for enhanced wireless coverage (e.g., indicating a new serving SSB, and/or providing additional or enhanced wireless coverage).

As a result, the base station 110 is enabled to properly associate PRACH preambles (e.g., transmitted in RACH occasions) to SSB beams when some RACH occasions, in a set of RACH occasions, are valid for all UEs in a network and some RACH occasions, in the set of RACH occasions, are only valid for some UEs in the network (and not valid for other UEs in the network). Additionally, UEs 120 may utilize the RACH occasions that are valid based at least in part on the time gap value indicated by the base station 110 to indicate additional information associated with the RACH procedure. This improves network performance by enabling the UE 120 and the base station 110 to quickly exchange information during the RACH procedure, as the UE 120 may utilize more RACH occasions than if the UE 120 were to use the pre-configured or stored time gap value associated with the RACH procedure.

As indicated above, FIG. 7 is provided as an example. Other examples may differ from what is described with respect to FIG. 7.

Figure 8:
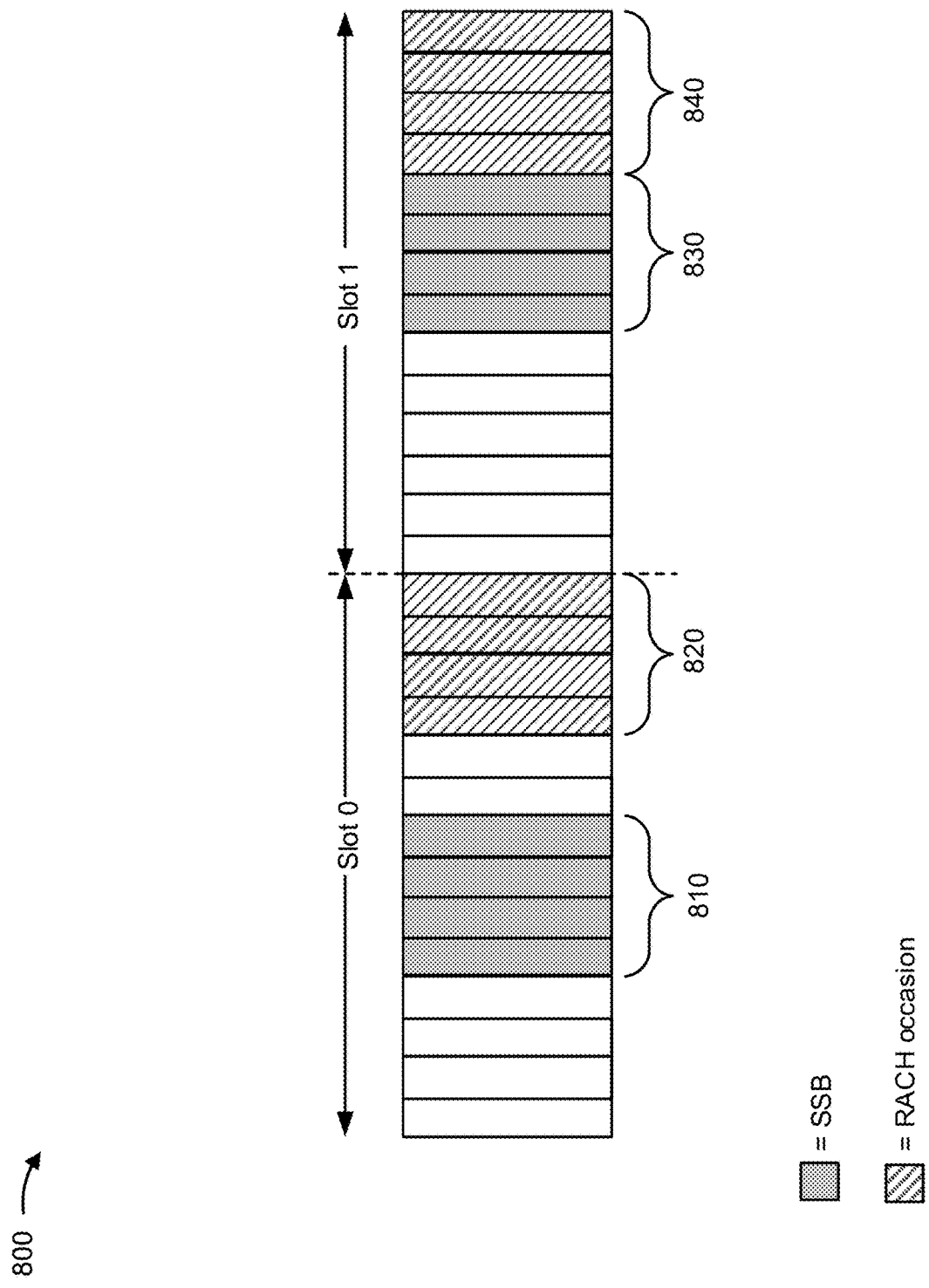

FIG. 8 is a diagram illustrating an example 800 associated with mapping aspects of a RACH procedure, in accordance with the present disclosure. As shown in FIG. 8, a RACH procedure may be associated with PRACH slots (e.g., slot 0 and/or slot 1). A RACH slot may include one or more symbols associated with SSB reception and one or more symbols associated with a RACH occasion.

As shown by reference number 810, a UE 120 may receive a first SSB, from a base station 110, in a first PRACH slot (e.g., slot 0). As shown by reference number 820, the first PRACH slot may include a RACH occasion (e.g., a transmission opportunity for the UE 120 associated with the RACH procedure). As shown in FIG. 8, the RACH occasion in the first PRACH slot may occur 2 symbols after the SSB reception (e.g., the first symbol associated with the RACH occasion may be 2 symbols after the last symbol associated with the SSB reception). The RACH occasion included in the first PRACH slot may be valid using a stored or pre-configured time gap value associated with the RACH procedure (e.g., as described above with respect to FIG. 6). For example, the stored or pre-configured time gap value may be 2 symbols. As a result, the RACH occasion included in the first PRACH slot may be valid for all UEs 120 (e.g., the RACH occasion included in the first PRACH slot may be included in the first set of RACH occasions described above with respect to FIG. 7).

As shown by reference number 830, a UE 120 may receive a second SSB, from a base station 110, in a second PRACH slot (e.g., slot 1). As shown by reference number 840, the second PRACH slot may include a RACH occasion. As shown in FIG. 8, the RACH occasion in the second PRACH slot may occur directly after the SSB reception (e.g., the first symbol associated with the RACH occasion may be directly after the last symbol associated with the SSB reception). The RACH occasion included in the second PRACH slot may be valid using a time gap value indicated by the base station 110 (e.g., as described above with respect to FIG. 6). As a result, the RACH occasion included in the second PRACH slot may be valid only for UEs 120 that include a RACH capability (e.g., a capability to receive and/or decode the signal from the base station 110 indicating the time gap value associated with the RACH procedure, as described above with respect to FIG. 7). The RACH occasion included in the second PRACH slot may be included in the second set of RACH occasions described above with respect to FIG. 7.

The UE 120 may select the RACH occasion included in the second PRACH slot to transmit a PRACH communication for different purposes associated with the RACH procedure. For example, the UE 120 may select the RACH occasion included in the second PRACH slot to transmit a PRACH communication indicating a need or request for enhanced wireless coverage, a capability of the UE 120, and/or a category of the UE 120, among other examples.

As indicated above, FIG. 8 is provided as an example. Other examples may differ from what is described with respect to FIG. 8.

Figure 9:
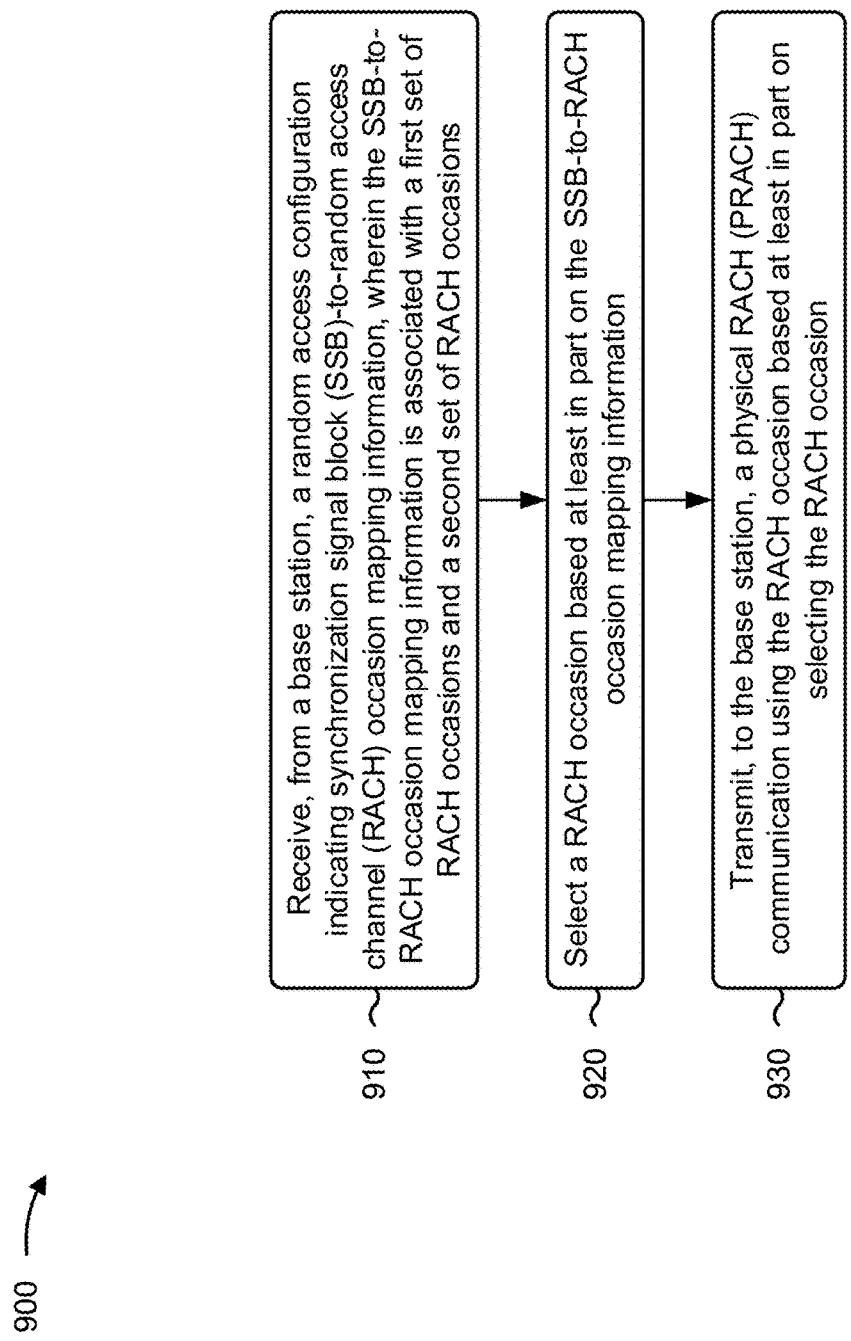
FIGS. 9-10 are diagrams illustrating example processes associated with mapping aspects of a RACH procedure, in accordance with the present disclosure.

FIG. 9 is a diagram illustrating an example process 900 performed, for example, by UE, in accordance with the present disclosure. Example process 900 is an example where the UE (e.g., UE 120) performs operations associated with mapping aspects of a RACH procedure.

As shown in FIG. 9, in some aspects, process 900 may include receiving, from a base station, a random access configuration indicating SSB-to-RACH occasion mapping information, wherein the SSB-to-RACH occasion mapping information is associated with a first set of RACH occasions and a second set of RACH occasions (block 910). For example, the user equipment (e.g., using receive processor 258, transmit processor 264, controller/processor 280, memory 282, and/or the like) may receive, from a base station, a random access configuration indicating SSB-to-RACH occasion mapping information, as described above. In some aspects, the SSB-to-RACH occasion mapping information is associated with a first set of RACH occasions and a second set of RACH occasions.

As further shown in FIG. 9, in some aspects, process 900 may include selecting a RACH occasion based at least in part on the SSB-to-RACH occasion mapping information (block 920). For example, the UE (e.g., using receive processor 258, transmit processor 264, controller/processor 280, memory 282, and/or the like) may select a RACH occasion based at least in part on the SSB-to-RACH occasion mapping information, as described above.

As further shown in FIG. 9, in some aspects, process 900 may include transmitting, to the base station, a PRACH communication using the RACH occasion based at least in part on selecting the RACH occasion (block 930). For example, the UE (e.g., using receive processor 258, transmit processor 264, controller/processor 280, memory 282, and/or the like) may transmit, to the base station, a PRACH communication using the RACH occasion based at least in part on selecting the RACH occasion, as described above.

Process 900 may include additional aspects, such as any single aspect or any combination of aspects described below and/or in connection with one or more other processes described elsewhere herein.

In a first aspect, the first set of RACH occasions are valid for each UE associated with the base station, and the second set of RACH occasions are valid for a proper subset of UEs associated with the base station.

In a second aspect, alone or in combination with the first aspect, the first set of RACH occasions are mapped to one or more SSBs before the second set of RACH occasions are mapped to one or more SSBs.

In a third aspect, alone or in combination with one or more of the first and second aspects, the RACH occasion is included in the second set of RACH occasions selecting the RACH occasion based at least in part on the SSB-to-RACH occasion mapping information comprises selecting the RACH occasion included in the second set of RACH occasions based at least in part on a RACH capability of the UE.

In a fourth aspect, alone or in combination with one or more of the first through third aspects, the RACH occasion is included in the second set of RACH occasions, and selecting the RACH occasion based at least in part on the SSB-to-RACH occasion mapping information comprises selecting the RACH occasion included in the second set of RACH occasions based at least in part on a measurement of an SSB, and transmitting, to the base station, the PRACH communication using the RACH occasion comprises transmitting, to the base station, the PRACH communication using the RACH occasion included in the second set of RACH occasions based at least in part on selecting the RACH occasion included in the second set of RACH occasions.

In a fifth aspect, alone or in combination with one or more of the first through fourth aspects, selecting the RACH occasion included in the second set of RACH occasions based at least in part on the measurement of the SSB comprises measuring a beam associated with the SSB to obtain an RSRP value of the beam of the SSB; and selecting the RACH occasion in the second set of RACH occasions that is associated with the SSB if the RSRP value of the beam of the SSB does not satisfy a threshold.

In a sixth aspect, alone or in combination with one or more of the first through fifth aspects, process 900 includes receiving, from the base station, a random access response that is based at least in part on transmitting the PRACH communication in the RACH occasion included in the second set of RACH occasions.

In a seventh aspect, alone or in combination with one or more of the first through sixth aspects, the RACH occasion is included in the second set of RACH occasions, and selecting the RACH occasion based at least in part on the SSB-to-RACH occasion mapping information comprises selecting the RACH occasion included in the second set of RACH occasions to indicate a capability of the UE, and transmitting, to the base station, the PRACH communication in the RACH occasion comprises transmitting, to the base station, the PRACH communication in the RACH occasion included in the second set of RACH occasions, where using the RACH occasion included in the second set of RACH occasions indicates the capability of the UE.

In an eighth aspect, alone or in combination with one or more of the first through seventh aspects, the UE is capable of decoding a message from the base station indicating a time gap value for a RACH procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
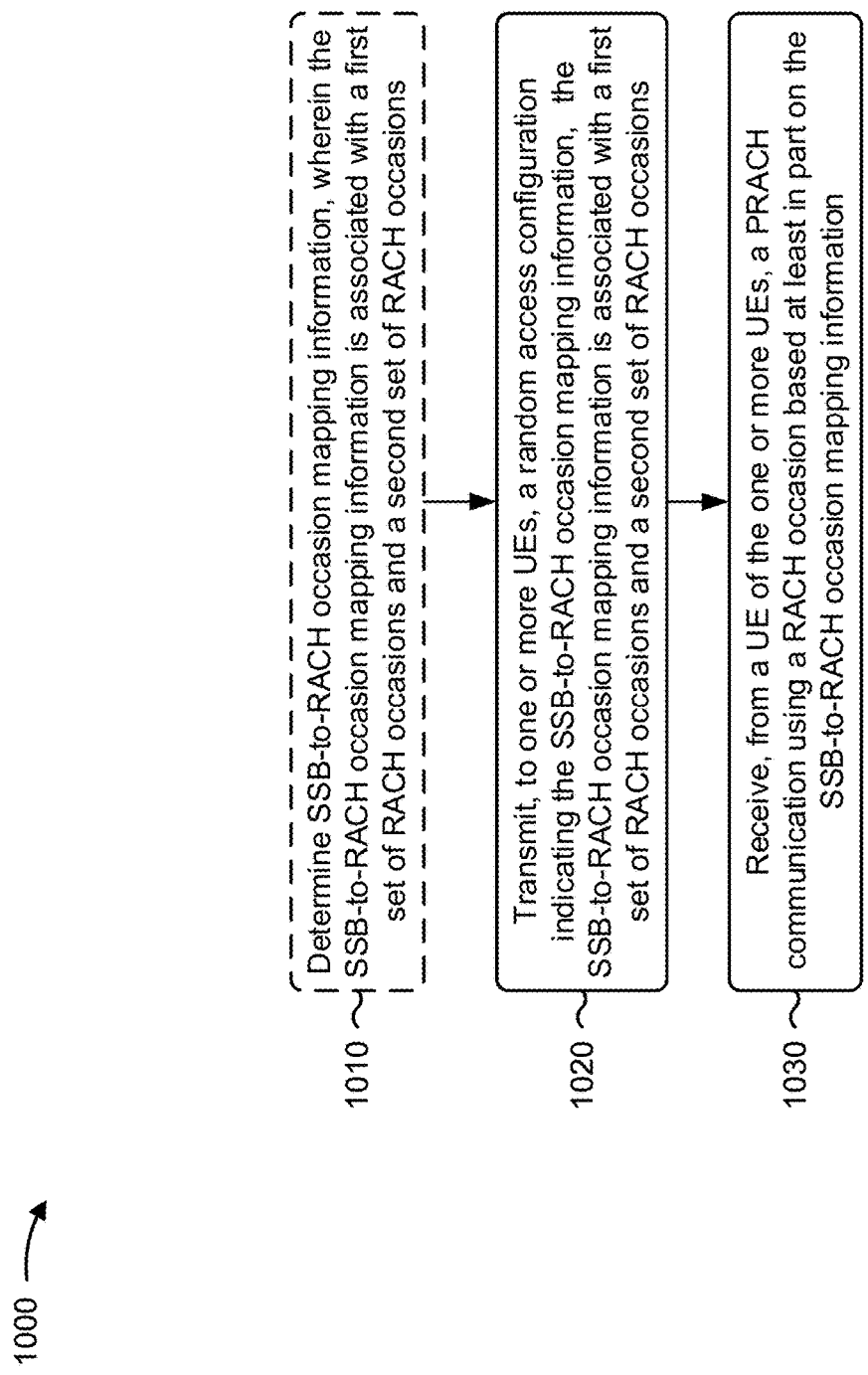

FIG. 10 is a diagram illustrating an example process 1000 performed, for example, by a base station, in accordance with the present disclosure. Example process 1000 is an example where the base station (e.g., base station 110) performs operations associated with mapping aspects of a RACH procedure.

As shown in FIG. 10, in some aspects, process 1000 may optionally include determining SSB-to-RACH occasion mapping information, wherein the SSB-to-RACH occasion mapping information is associated with a first set of RACH occasions and a second set of RACH occasions (block 1010). For example, the base station (e.g., using transmit processor 220, receive processor 238, controller/processor 240, memory 242, and/or the like) may determine SSB-to-RACH occasion mapping information, as described above. In some aspects, the SSB-to-RACH occasion mapping information is associated with a first set of RACH occasions and a second set of RACH occasions.

As further shown in FIG. 10, in some aspects, process 1000 may include transmitting, to one or more UEs, a random access configuration indicating the SSB-to-RACH occasion mapping information, the SSB-to-RACH occasion mapping information is associated with a first set of RACH occasions and a second set of RACH occasions (block 1020). For example, the base station (e.g., using transmit processor 220, receive processor 238, controller/processor 240, memory 242, and/or the like) may transmit, to one or more UEs, a random access configuration indicating the SSB-to-RACH occasion mapping information, the SSB-to-RACH occasion mapping information is associated with a first set of RACH occasions and a second set of RACH occasions, as described above.

As further shown in FIG. 10, in some aspects, process 1000 may include receiving, from a UE of the one or more UEs, a PRACH communication using a RACH occasion based at least in part on the SSB-to-RACH occasion mapping information (block 1030). For example, the base station (e.g., using transmit processor 220, receive processor 238, controller/processor 240, memory 242, and/or the like) may receive, from a UE of the one or more UEs, a PRACH communication using a RACH occasion based at least in part on the SSB-to-RACH occasion mapping information, as described above.

Process 1000 may include additional aspects, such as any single aspect or any combination of aspects described below and/or in connection with one or more other processes described elsewhere herein.

In a first aspect, the first set of RACH occasions are valid for each UE associated with the base station, and the second set of RACH occasions are valid for a proper subset of UEs associated with the base station.

In a second aspect, alone or in combination with the first aspect, process 1000 may include mapping RACH occasions included in the first set of RACH occasions to one or more SSBs, and mapping RACH occasions included in the second set of RACH occasions to one or more SSBs.

In a third aspect, alone or in combination with one or more of the first and second aspects, the RACH occasions included in the first set of RACH occasions are mapped to one or more SSBs before the RACH occasions included in the second set of RACH occasions are mapped to one or more SSBs.

In a fourth aspect, alone or in combination with one or more of the first through third aspects, mapping the RACH occasions included in the second set of RACH occasions to the one or more SSBs comprises mapping the RACH occasions included in the second set of RACH occasions to one or more SSBs for a proper subset of UEs associated with the base station for which the second set of RACH occasions are valid.

In a fifth aspect, alone or in combination with one or more of the first through fourth aspects, receiving, from the UE of the one or more UEs, the PRACH communication using the RACH occasion comprises identifying an SSB beam associated with the RACH occasion based at least in part on the SSB-to-RACH occasion mapping information.

In a sixth aspect, alone or in combination with one or more of the first through fifth aspects, the RACH occasion is included in the second set of RACH occasions, and receiving, from the UE of the one or more UEs, the PRACH communication using the RACH occasion comprises receiving, from the UE of the one or more UEs, the PRACH communication using the RACH occasion included in the second set of RACH occasions indicating a request for wireless coverage enhancement, wherein the request for wireless coverage enhancement is based at least in part on a measurement of a beam of an SSB associated with the RACH occasion included in the second set of RACH occasions.

In a seventh aspect, alone or in combination with one or more of the first through sixth aspects, process 1000 includes configuring a random access response to the PRACH communication based at least in part on receiving the PRACH communication in the RACH occasion included in the second set of RACH occasions indicating the request for wireless coverage enhancement; and transmitting, to the UE of the one or more UEs, the random access response to the PRACH communication.

In an eighth aspect, alone or in combination with one or more of the first through seventh aspects, the RACH occasion is included in the second set of RACH occasions, and receiving, from the UE of the one or more UEs, the PRACH communication using the RACH occasion comprises receiving, from the UE, the PRACH communication using the RACH occasion included in the second set of RACH occasions indicating a capability of the UE, and determining the capability of the UE based at least in part on receiving the PRACH communication in a RACH occasion included in the second set of RACH occasions.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
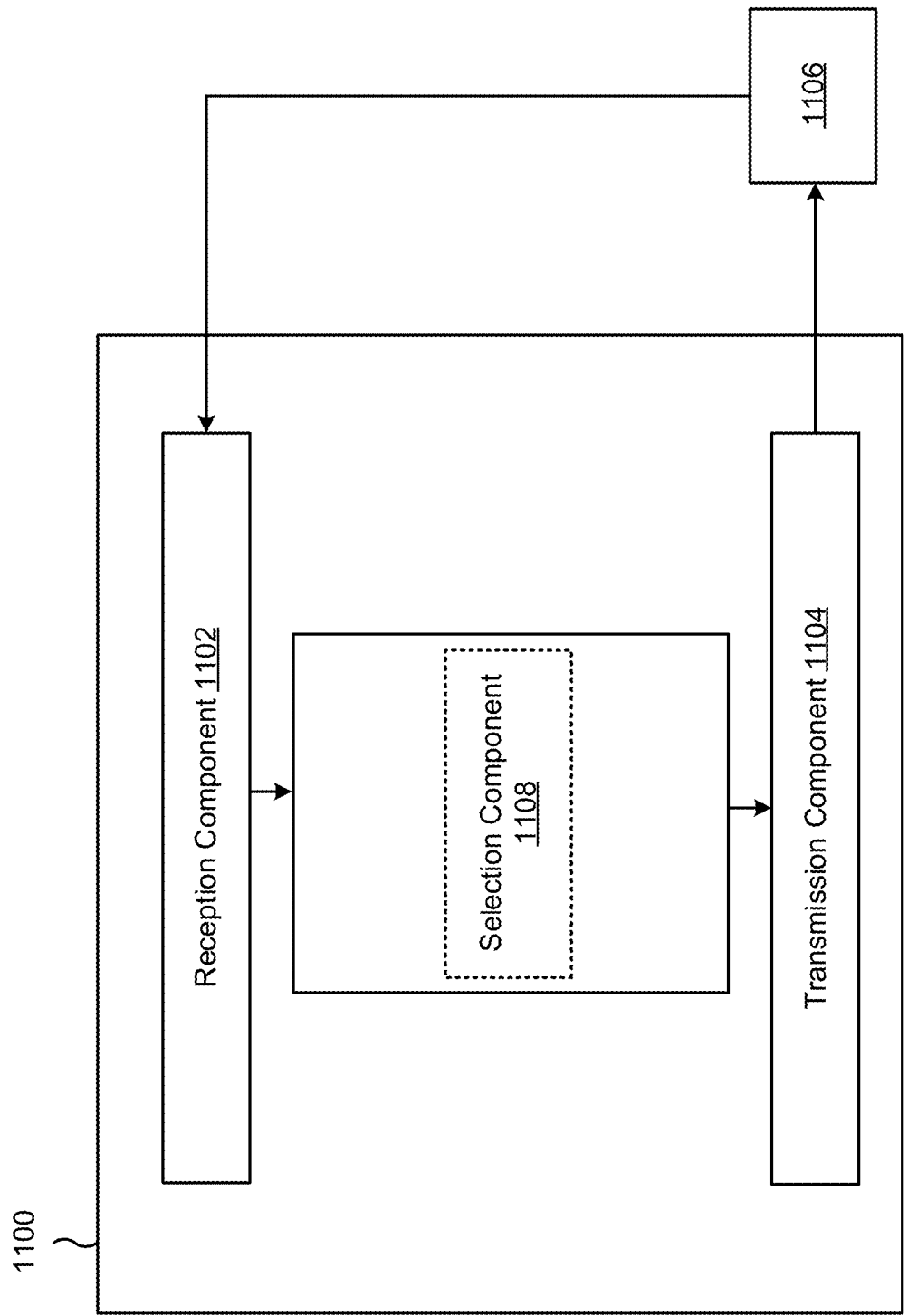
FIGS. 11-12 are diagrams illustrating example apparatuses for wireless communication, in accordance with the present disclosure.

FIG. 11 is a diagram illustrating an example apparatus 1100 for wireless communication, in accordance with the present disclosure. The apparatus 1100 may be a user equipment, or a user equipment may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a selection component 1108, among other examples.

In some aspects, the apparatus 1100 may be configured to perform one or more operations described herein in connection with FIGS. 7-8. Additionally or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the user equipment described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the user equipment described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the user equipment described above in connection with FIG. 2. In some aspects, the transmission component 1104 may be collocated with the reception component 1102 in a transceiver.

The reception component 1102 may receive, from a base station, a random access configuration indicating SSB-to-RACH occasion mapping information, where the SSB-to-RACH occasion mapping information is associated with a first set of RACH occasions and a second set of RACH occasions. The selection component 1108 may select a RACH occasion based at least in part on the SSB-to-RACH occasion mapping information. The transmission component 1104 may transmit, to the base station, a PRACH communication using the RACH occasion based at least in part on selecting the RACH occasion.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
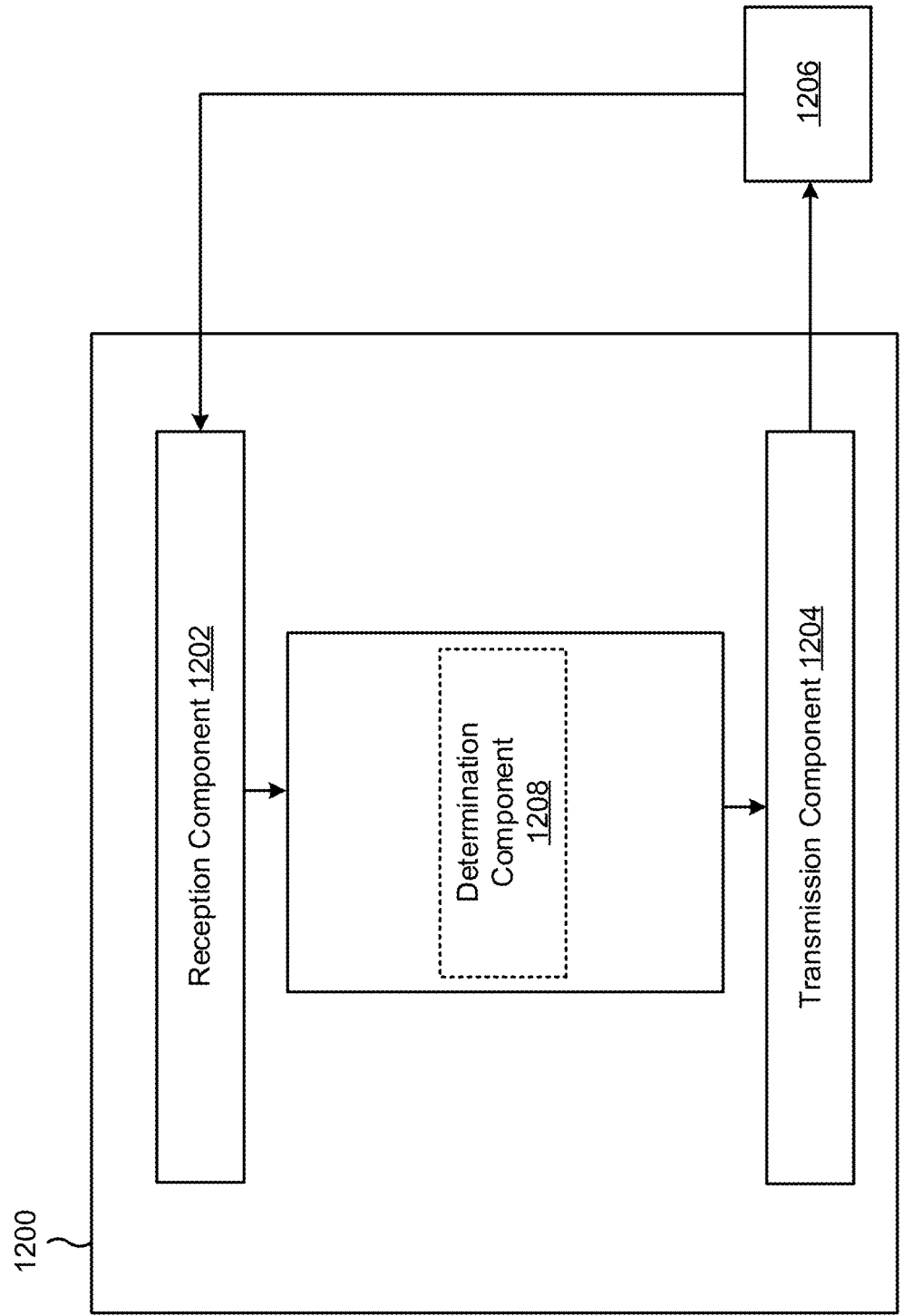

FIG. 12 is a diagram illustrating an example apparatus 1200 for wireless communication, in accordance with the present disclosure. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a determination component 1208, among other examples.

In some aspects, the apparatus 1200 may be configured to perform one or more operations described herein in connection with FIGS. 7-8. Additionally or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be collocated with the reception component 1202 in a transceiver.

The determination component 1208 may determine SSB-to-RACH occasion mapping information, wherein the SSB-to-RACH occasion mapping information is associated with a first set of RACH occasions and a second set of RACH occasions. The transmission component 1204 may transmit, to one or more UEs, a random access configuration indicating the SSB-to-RACH occasion mapping information. The reception component 1202 may receive, from a UE of the one or more UEs, a PRACH communication using a RACH occasion based at least in part on the SSB-to-RACH occasion mapping information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a base station, a random access configuration indicating synchronization signal block (SSB)-to-random access channel (RACH) occasion mapping information, wherein the SSB-to-RACH occasion mapping information is associated with a first set of RACH occasions and a second set of RACH occasions; selecting a RACH occasion based at least in part on the SSB-to-RACH occasion mapping information; and transmitting, to the base station, a physical RACH (PRACH) communication using the RACH occasion based at least in part on selecting the RACH occasion.

Aspect 2: The method of Aspect 1, wherein the first set of RACH occasions are valid for each UE associated with the base station; and wherein the second set of RACH occasions are valid for a proper subset of UEs associated with the base station.

Aspect 3: The method of any of Aspects 1-2, wherein the first set of RACH occasions are mapped to one or more SSBs before the second set of RACH occasions are mapped to one or more SSBs.

Aspect 4: The method of any of Aspects 1-3, wherein the RACH occasion is included in the second set of RACH occasions, and wherein selecting the RACH occasion based at least in part on the SSB-to-RACH occasion mapping information comprises: selecting a RACH occasion included in the second set of RACH occasions based at least in part on a RACH capability of the UE.

Aspect 5: The method of any of Aspects 1-4, wherein the RACH occasion is included in the second set of RACH occasions, and wherein selecting the RACH occasion based at least in part on the SSB-to-RACH occasion mapping information comprises: selecting the RACH occasion included in the second set of RACH occasions based at least in part on a measurement of an SSB; and wherein transmitting, to the base station, the PRACH communication using the RACH occasion comprises: transmitting, to the base station, the PRACH communication in the RACH occasion included using the second set of RACH occasions based at least in part on selecting the RACH occasion included in the second set of RACH occasions.

Aspect 6: The method of Aspect 5, wherein selecting the RACH occasion included in the second set of RACH occasions based at least in part on the measurement of the SSB comprises: measuring a beam associated with the SSB to determine a reference signal receive power (RSRP) value of the beam of the SSB; and selecting the RACH occasion in the second set of RACH occasions that is associated with the SSB if the RSRP value of the beam of the SSB does not satisfy a threshold.

Aspect 7: The method of any of Aspects 5-6, further comprising: receiving, from the base station, a random access response that is based at least in part on transmitting the PRACH communication in the RACH occasion included in the second set of RACH occasions.

Aspect 8: The method of any of Aspects 1-7, wherein the RACH occasion is included in the second set of RACH occasions, and wherein selecting the RACH occasion based at least in part on the SSB-to-RACH occasion mapping information comprises: selecting the RACH occasion included in the second set of RACH occasions to indicate a capability of the UE, wherein transmitting, to the base station, the PRACH communication in the RACH occasion comprises: transmitting, to the base station, the PRACH communication in the RACH occasion included in the second set of RACH occasions, wherein using the RACH occasion included in the second set of RACH occasions indicates the capability of the UE.

Aspect 9: The method of any of Aspects 1-8, wherein the UE is capable of decoding a message from the base station indicating a time gap value for a RACH procedure.

Aspect 10: A method of wireless communication performed by a base station, comprising: transmitting, to one or more UEs, a random access configuration indicating synchronization signal block (SSB)-to-random access channel (RACH) occasion mapping information, wherein the SSB-to-RACH occasion mapping information is associated with a first set of RACH occasions and a second set of RACH occasions; and receiving, from a UE of the one or more UEs, a physical RACH (PRACH) communication using a RACH occasion based at least in part on the SSB-to-RACH occasion mapping information.

Aspect 11: The method of Aspect 10, wherein the first set of RACH occasions are valid for each UE associated with the base station; and wherein the second set of RACH occasions are valid for a proper subset of UEs associated with the base station.

Aspect 12: The method of any of Aspects 10-11, further comprising: mapping RACH occasions included in the first set of RACH occasions to one or more SSBs; and mapping RACH occasions included in the second set of RACH occasions to one or more SSBs.

Aspect 13: The method of Aspect 12, wherein the RACH occasions included in the first set of RACH occasions are mapped to one or more SSBs before the RACH occasions included in the second set of RACH occasions are mapped to one or more SSBs.

Aspect 14: The method of any of Aspects 12-13, wherein mapping the RACH occasions included in the second set of RACH occasions to the one or more SSBs comprises: mapping the RACH occasions included in the second set of RACH occasions to one or more SSBs for a proper subset of UEs associated with the base station for which the second set of RACH occasions are valid.

Aspect 15: The method of any of Aspects 10-14, wherein receiving, from the UE of the one or more UEs, the PRACH communication using the RACH occasion comprises: identifying an SSB beam associated with the RACH occasion based at least in part on the SSB-to-RACH occasion mapping information.

Aspect 16: The method of any of Aspects 10-15, wherein the RACH occasion is included in the second set of RACH occasions, and wherein receiving, from the UE of the one or more UEs, the PRACH communication using the RACH occasion comprises: receiving, from the UE of the one or more UEs, the PRACH communication using the RACH occasion included in the second set of RACH occasions indicating a request for wireless coverage enhancement, wherein the request for wireless coverage enhancement is based at least in part on a measurement of a beam of an SSB associated with the RACH occasion included in the second set of RACH occasions.

Aspect 17: The method of Aspect 16, further comprising: configuring a random access response to the PRACH communication based at least in part on receiving the PRACH communication in the RACH occasion included in the second set of RACH occasions indicating the request for wireless coverage enhancement; and transmitting, to the UE of the one or more UEs, the random access response to the PRACH communication.

Aspect 18: The method of any of Aspects 10-17, wherein the RACH occasion is included in the second set of RACH occasions, and wherein receiving, from the UE of the one or more UEs, the PRACH communication using the RACH occasion comprises: receiving, from the UE, the PRACH communication using the RACH occasion included in the second set of RACH occasions indicating a capability of the UE; and determining the capability of the UE based at least in part on receiving the PRACH communication in a RACH occasion included in the second set of RACH occasions.

Aspect 19: An apparatus for wireless communication at a device, comprising a processor; memory coupled with the processor; and instructions stored in the memory and executable by the processor to cause the apparatus to perform the method of one or more of Aspects 1-9.

Aspect 20: A device for wireless communication, comprising a memory and one or more processors coupled to the memory, the one or more processors configured to perform the method of one or more of Aspects 1-9.

Aspect 21: An apparatus for wireless communication, comprising at least one means for performing the method of one or more of Aspects 1-9.

Aspect 22: A non-transitory computer-readable medium storing code for wireless communication, the code comprising instructions executable by a processor to perform the method of one or more of Aspects 1-9.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-18.

Aspect 25: A device for wireless communication, comprising a memory and one or more processors coupled to the memory, the one or more processors configured to perform the method of one or more of Aspects 10-18.

Aspect 26: An apparatus for wireless communication, comprising at least one means for performing the method of one or more of Aspects 10-18.

Aspect 27: A non-transitory computer-readable medium storing code for wireless communication, the code comprising instructions executable by a processor to perform the method of one or more of Aspects 10-18.

Aspect 28: A non-transitory computer-readable medium storing a set of instructions for wireless communication, the set of instructions comprising one or more instructions that, when executed by one or more processors of a device, cause the device to perform the method of one or more of Aspects 10-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving, from a base station, a random access configuration indicating synchronization signal block (SSB)-to-random access channel (RACH) occasion mapping information, the SSB-to-RACH occasion mapping information being associated with:
        a first set of RACH occasions that are valid for each UE associated with the base station based at least in part on a configured time gap value, and
        a second set of RACH occasions that are valid for a proper subset of UEs associated with the base station based at least in part on another time gap value indicated by the base station,
        wherein RACH occasions of the first set of RACH occasions or the second set of RACH occasions are valid based at least in part on a quantity of symbols between a symbol of an SSB and a symbol of a RACH occasion satisfying a time gap value;
    selecting a RACH occasion based at least in part on the SSB-to-RACH occasion mapping information; and
    transmitting, to the base station, a physical RACH (PRACH) communication using the RACH occasion based at least in part on selecting the RACH occasion.

2. The method of claim 1, wherein the first set of RACH occasions are mapped to one or more SSBs before the second set of RACH occasions are mapped to one or more SSBs.

3. The method of claim 1, wherein the RACH occasion is included in the second set of RACH occasions, and wherein selecting the RACH occasion based at least in part on the SSB-to-RACH occasion mapping information comprises:
    selecting the RACH occasion included in the second set of RACH occasions based at least in part on a RACH capability of the UE.

4. The method of claim 1, wherein the RACH occasion is included in the second set of RACH occasions, wherein selecting the RACH occasion based at least in part on the SSB-to-RACH occasion mapping information comprises:
    selecting the RACH occasion included in the second set of RACH occasions based at least in part on a measurement of an SSB; and
    wherein transmitting, to the base station, the PRACH communication using the RACH occasion comprises:
        transmitting, to the base station, the PRACH communication in the RACH occasion included using the second set of RACH occasions based at least in part on selecting the RACH occasion included in the second set of RACH occasions.

5. The method of claim 4, wherein selecting the RACH occasion included in the second set of RACH occasions based at least in part on the measurement of the SSB comprises:
    measuring a beam associated with the SSB to determine a reference signal receive power (RSRP) value of the beam of the SSB; and
    selecting the RACH occasion in the second set of RACH occasions that is associated with the SSB if the RSRP value of the beam of the SSB does not satisfy a threshold.

6. The method of claim 4, further comprising:
    receiving, from the base station, a random access response that is based at least in part on transmitting the PRACH communication in the RACH occasion included in the second set of RACH occasions.

7. The method of claim 1, wherein the RACH occasion is included in the second set of RACH occasions, and wherein selecting the RACH occasion based at least in part on the SSB-to-RACH occasion mapping information comprises:
    selecting the RACH occasion included in the second set of RACH occasions to indicate a capability of the UE,
    wherein transmitting, to the base station, the PRACH communication in the RACH occasion comprises:
        transmitting, to the base station, the PRACH communication in the RACH occasion included in the second set of RACH occasions, wherein using the RACH occasion included in the second set of RACH occasions indicates the capability of the UE.

8. The method of claim 1, wherein the UE is capable of decoding a message from the base station indicating the other time gap value.

9. A user equipment (UE) for wireless communication, comprising:
    one or more memories; and
    one or more processors coupled to the one or more memories, the one or more processors configured to:
        receive, from a base station, a random access configuration indicating synchronization signal block (SSB)-to-random access channel (RACH) occasion mapping information, the SSB-to-RACH occasion mapping information being associated with:
            a first set of RACH occasions that are valid for each UE associated with the base station based at least in part on a configured time gap value, and
            a second set of RACH occasions that are valid for a proper subset of UEs associated with the base station based at least in part on another time gap value indicated by the base station,
            wherein RACH occasions of the first set of RACH occasions or the second set of RACH occasions are valid based at least in part on a quantity of symbols between a symbol of an SSB and a symbol of a RACH occasion satisfying a time gap value;
        select a RACH occasion based at least in part on the SSB-to-RACH occasion mapping information; and transmit, to the base station, a physical RACH (PRACH) communication using the RACH occasion based at least in part on selecting the RACH occasion.

10. The UE of claim 9, wherein the first set of RACH occasions are mapped to one or more SSBs before the second set of RACH occasions are mapped to one or more SSBs.

11. The UE of claim 9, wherein the RACH occasion is included in the second set of RACH occasions, and wherein the one or more processors, to select the RACH occasion based at least in part on the SSB-to-RACH occasion mapping information, are configured to:
select the RACH occasion included in the second set of RACH occasions based at least in part on a RACH capability of the UE.

12. The UE of claim 9, wherein the RACH occasion is included in the second set of RACH occasions, and wherein the one or more processors, to select the RACH occasion based at least in part on the SSB-to-RACH occasion mapping information, are configured to:
select the RACH occasion included in the second set of RACH occasions based at least in part on a measurement of an SSB; and
wherein the one or more processors, to transmit, to the base station, the PRACH communication using the RACH occasion, are configured to:
transmit, to the base station, the PRACH communication in the RACH occasion included using the second set of RACH occasions based at least in part on selecting the RACH occasion included in the second set of RACH occasions.

13. The UE of claim 12, wherein the one or more processors, to select the RACH occasion included in the second set of RACH occasions based at least in part on the measurement of the SSB, are configured to:
measure a beam associated with the SSB to determine a reference signal receive power (RSRP) value of the beam of the SSB; and
select the RACH occasion in the second set of RACH occasions that is associated with the SSB if the RSRP value of the beam of the SSB does not satisfy a threshold.

14. The UE of claim 12, wherein the one or more processors are further configured to:
receive, from the base station, a random access response that is based at least in part on transmitting the PRACH communication in the RACH occasion included in the second set of RACH occasions.

15. The UE of claim 9, wherein the RACH occasion is included in the second set of RACH occasions, and wherein the one or more processors, to select the RACH occasion included in the second set of RACH occasions based at least in part on the SSB-to-RACH occasion mapping information, are configured to:
select the RACH occasion included in the second set of RACH occasions to indicate a capability of the UE,
wherein the one or more processors, to transmit, to the base station, the PRACH communication in the RACH occasion, are configured to:
transmit, to the base station, the PRACH communication in the RACH occasion included in the second set of RACH occasions, wherein using the RACH occasion included in the second set of RACH occasions indicates the capability of the UE.

16. The UE of claim 9, wherein the UE is capable of decoding a message from the base station indicating the other time gap value.

17. A method of wireless communication performed by a base station, comprising:
transmitting, to one or more user equipments (UEs), a random access configuration indicating synchronization signal block (SSB)-to-random access channel (RACH) occasion mapping information, the SSB-to-RACH occasion mapping information being associated with:
a first set of RACH occasions that are valid for each UE associated with the base station based at least in part on a configured time gap value, and
a second set of RACH occasions that are valid for a proper subset of UEs associated with the base station based at least in part on another time gap value indicated by the base station,
wherein RACH occasions of the first set of RACH occasions or the second set of RACH occasions are valid based at least in part on a quantity of symbols between a symbol of an SSB and a symbol of a RACH occasion satisfying a time gap value; and
receiving, from a UE of the one or more UEs, a physical RACH (PRACH) communication using a RACH occasion based at least in part on the SSB-to-RACH occasion mapping information.

18. The method of claim 17, further comprising:
mapping RACH occasions included in the first set of RACH occasions to one or more SSBs; and
mapping RACH occasions included in the second set of RACH occasions to one or more SSBs.

19. The method of claim 18, wherein the first set of RACH occasions are mapped to the one or more SSBs before the second set of RACH occasions are mapped to the one or more SSBs.

20. The method of claim 18, wherein mapping the RACH occasions included in the second set of RACH occasions to the one or more SSBs comprises:
mapping the RACH occasions included in the second set of RACH occasions to one or more SSBs for the proper subset of UEs.

21. The method of claim 17, wherein the RACH occasion is included in the second set of RACH occasions, and wherein receiving, from the UE of the one or more UEs, the PRACH communication using the RACH occasion comprises:
receiving, from the UE of the one or more UEs, the PRACH communication using the RACH occasion included in the second set of RACH occasions indicating a request for wireless coverage enhancement, wherein the request for wireless coverage enhancement is based at least in part on a measurement of a beam of an SSB associated with the RACH occasion included in the second set of RACH occasions.

22. The method of claim 21, further comprising:
configuring a random access response to the PRACH communication based at least in part on receiving the PRACH communication in the RACH occasion included in the second set of RACH occasions indicating the request for wireless coverage enhancement; and
transmitting, to the UE of the one or more UEs, the random access response to the PRACH communication.

23. The method of claim 17, wherein the RACH occasion is included in the second set of RACH occasions, and wherein receiving, from the UE of the one or more UEs, the PRACH communication using the RACH occasion comprises:
receiving, from the UE, the PRACH communication using the RACH occasion included in the second set of RACH occasions indicating a capability of the UE; and
determining the capability of the UE based at least in part on receiving the PRACH communication in a RACH occasion included in the second set of RACH occasions.

24. A base station for wireless communication, comprising:
one or more memories; and
one or more processors coupled to the one or more memories, the one or more processors configured to:
transmit, to one or more user equipments (UEs), a random access configuration indicating synchronization signal block (SSB)-to-random access channel (RACH) occasion mapping information, the SSB-to-RACH occasion mapping information being associated with:
a first set of RACH occasions that are valid for each UE associated with the base station based at least in part on a configured time gap value, and
a second set of RACH occasions that are valid for a proper subset of UEs associated with the base station based at least in part on another time gap value indicated by the base station,
wherein RACH occasions of the first set of RACH occasions or the second set of RACH occasions are valid based at least in part on a quantity of symbols between a symbol of an SSB and a symbol of a RACH occasion satisfying a time gap value; and
receive, from a UE of the one or more UEs, a physical RACH (PRACH) communication using a RACH occasion based at least in part on the SSB-to-RACH occasion mapping information.

25. The base station of claim 24, wherein the one or more processors are further configured to:
map RACH occasions included in the first set of RACH occasions to one or more SSBs; and
map RACH occasions included in the second set of RACH occasions to one or more SSBs.

26. The base station of claim 25, wherein the first set of RACH occasions are mapped to the one or more SSBs before the second set of RACH occasions are mapped to the one or more SSBs.

27. The base station of claim 25, wherein the one or more processors, to map the RACH occasions included in the second set of RACH occasions to the one or more SSBs, are configured to:
map the RACH occasions included in the second set of RACH occasions to one or more SSBs for the proper subset of UEs.

28. The base station of claim 24, wherein the RACH occasion is included in the second set of RACH occasions, and wherein receiving, from the UE of the one or more UEs, the PRACH communication using the RACH occasion comprises:
receive, from the UE of the one or more UEs, the PRACH communication using the RACH occasion included in the second set of RACH occasions indicating a request for wireless coverage enhancement, wherein the request for wireless coverage enhancement is based at least in part on a measurement of a beam of an SSB associated with the RACH occasion included in the second set of RACH occasions.

29. The base station of claim 28, wherein the one or more processors are further configured to:
configure a random access response to the PRACH communication based at least in part on receiving the PRACH communication in the RACH occasion included in the second set of RACH occasions indicating the request for wireless coverage enhancement; and
transmit, to the UE of the one or more UEs, the random access response to the PRACH communication.

30. The base station of claim 24, wherein the RACH occasion is included in the second set of RACH occasions, and wherein receiving, from the UE of the one or more UEs, the PRACH communication using the RACH occasion comprises:
receive, from the UE, the PRACH communication using the RACH occasion included in the second set of RACH occasions indicating a capability of the UE; and
determine the capability of the UE based at least in part on receiving the PRACH communication in a RACH occasion included in the second set of RACH occasions.

* * * * *